(12) United States Patent
Hasegawa

(10) Patent No.: US 10,295,180 B2
(45) Date of Patent: May 21, 2019

(54) EXHAUST TUBE HOLDING MEMBER AND EXHAUST STRUCTURE FOR COMBUSTION

(71) Applicant: NORITZ CORPORATION, Hyogo (JP)

(72) Inventor: Takahide Hasegawa, Kakogawa (JP)

(73) Assignee: NORITZ CORPORATION, Hyogo (JP)

( * ) Notice: Subject to any disclaimer, the term of this patent is extended or adjusted under 35 U.S.C. 154(b) by 370 days.

(21) Appl. No.: 15/097,903

(22) Filed: Apr. 13, 2016

(65) Prior Publication Data

US 2017/0299177 A1    Oct. 19, 2017

(51) Int. Cl.
*F16L 7/02*     (2006.01)
*F23J 13/02*    (2006.01)
*F16L 25/14*    (2006.01)

(52) U.S. Cl.
CPC .............. *F23J 13/025* (2013.01); *F16L 7/02* (2013.01); *F16L 25/14* (2013.01); *F23J 2213/101* (2013.01)

(58) Field of Classification Search
CPC ....... F23J 13/025; F23J 2213/101; F16L 7/02; F16L 25/14
USPC .......................................... 454/4, 35, 36, 37
See application file for complete search history.

(56) References Cited

U.S. PATENT DOCUMENTS

| | | | |
|---|---|---|---|
| 717,592 A | | 1/1903 | Melsha |
| 1,328,647 A | * | 1/1920 | Carl ........................ F23J 11/00 454/35 |
| 1,364,792 A | * | 1/1921 | Nutting .................. F23J 15/022 454/35 |
| 1,416,968 A | * | 5/1922 | Nutting .................. F23J 15/022 454/35 |
| 1,785,228 A | * | 12/1930 | Schmidt .................... B63J 2/10 126/59.5 |
| 3,209,670 A | * | 10/1965 | Twickler ................. F23L 17/02 454/36 |

(Continued)

OTHER PUBLICATIONS

An Office Action issued by the U.S. Patent Office dated Nov. 16, 2018, which corresponds to U.S. Appl. No. 15/083,846 and is related to U.S. Appl. No. 15/097,903.

(Continued)

*Primary Examiner* — Gregory L Huson
*Assistant Examiner* — Dana K Tighe
(74) *Attorney, Agent, or Firm* — Studebaker & Brackett PC

(57) ABSTRACT

An exhaust tube holding member is supported by an exhaust pipe and holds, on an inner peripheral surface thereof, an exhaust tube to be inserted into the exhaust pipe. The exhaust tube holding member includes a first annular portion, a second annular portion, and an outward protruding portion. The first annular portion is formed with a first through hole. The second annular portion is formed with a second through hole in communication with the first through hole and having an inner diameter larger than that of the first through hole, and is connected to the first annular portion. The outward protruding portion protrudes peripherally outward from an outer peripheral surface of the second annular portion and is supported by the exhaust pipe. The inward protruding portion protrudes peripherally inward from an inner peripheral surface of the second annular portion and is supported by the exhaust pipe.

4 Claims, 18 Drawing Sheets

(56) References Cited

U.S. PATENT DOCUMENTS

| | | | | |
|---|---|---|---|---|
| 3,636,853 A | * | 1/1972 | Sable | F23L 17/02 |
| | | | | 454/39 |
| 4,886,228 A | | 12/1989 | Kennedy | |
| 5,286,040 A | | 2/1994 | Gavin | |
| 5,649,712 A | | 7/1997 | Ekholm | |
| 7,150,437 B1 | | 12/2006 | Teeters | |
| 8,881,689 B2 | * | 11/2014 | Kameyama | F24H 1/28 |
| | | | | 122/19.2 |
| 2015/0056903 A1 | | 2/2015 | Nagano et al. | |

OTHER PUBLICATIONS

Office Action issued by the U.S. Patent and Trademark Office dated Aug. 27, 2018, which corresponds to U.S. Appl. No. 15/097,865 and is related to U.S. Appl. No. 15/097,903.

* cited by examiner

EXHAUST TUBE HOLDING MEMBER AND EXHAUST STRUCTURE FOR COMBUSTION

BACKGROUND OF THE INVENTION

Field of the Invention

The present invention relates to an exhaust tube holding member and an exhaust structure for combustion apparatus.

Description of the Background Art

A combustion apparatus such as a water heater or a room heater is disposed in such a manner that a main body thereof is installed indoors. For example, in the United States, a tank water heater is primarily used as the water heater, and the tank water heater is installed in such as an indoor boiler room. Exhaust gas generated from combustion in such combustion apparatus is generally emitted outside the roof of a building through an exhaust pipe (B vent).

When replacing such combustion apparatus (for example, a tank water heater) already installed in a building with a new combustion apparatus (for example, an instantaneous water heater), the replacement may encounter such a situation that the outer appearance of the building must be reserved and thereby the already-placed exhaust pipe cannot be removed.

In the situation mentioned above, it is possible to perform the replacement of the combustion apparatus by reusing the already-placed exhaust pipe and inserting a new exhaust tube inside the existing exhaust pipe. It is known that the new exhaust tube (flexible exhaust tube) is held by using an exhaust adapter disclosed in US 2015/0056903A1. On the other hand, the already-placed exhaust pipe may be available on the market with different sizes and shapes, and thus, it is desired to deal with the problem that the already-placed exhaust pipe may have different sizes and shapes.

SUMMARY OF THE INVENTION

The present invention has been accomplished in view of the aforementioned problems, and it is therefore an object of the present invention to provide an exhaust tube holding member and an exhaust structure for combustion apparatus capable of dealing with any exhaust pipe with different sizes and shapes.

The exhaust tube holding member of the present invention configured to be supported by an exhaust pipe extending from the inside to the outside of a building, and hold, on an inner peripheral surface thereof, an exhaust tube to be inserted into the exhaust pipe. The exhaust tube holding member includes a first annular portion, a second annular portion, an outward protruding portion, and an inward protruding portion. The first annular portion is formed with a first through hole. The second annular portion is formed with a second through hole in communication with the first through hole and having an inner diameter larger than that of the first through hole, and is connected to the first annular portion. The outward protruding portion protrudes peripherally outward from an outer peripheral surface of the second annular portion and is supported by the exhaust pipe. The inward protruding portion protrudes peripherally inward from an inner peripheral surface of the second annular portion and is supported by the exhaust pipe.

According to the exhaust tube holding member of the present invention, the outward protruding portion protrudes peripherally outward from the outer peripheral surface of the second annular portion, and the inward protruding portion protrudes peripherally inward from the inner peripheral surface of the second annular portion. Therefore, as the outward protruding portion abuts against the inner peripheral surface of the exhaust pipe, the outward protruding portion can be supported by exhaust pipe, and as the inward protruding portion abuts against the outer peripheral surface of the exhaust pipe, the inward protruding portion can be supported by the exhaust pipe. Thus, it is possible to use a single exhaust tube holding member to deal with various exhaust pipes of different sizes.

In the exhaust tube holding member mentioned above, the outward protruding portion is annular. Thus, as the outward protruding portion abuts against the inner peripheral surface of the exhaust pipe, a gap between the outward protruding portion and the inner peripheral surface of the exhaust pipe can be sealed. When the word "seal" or "sealed" is used in the present specification, it means that relating components of the combustion device are sealed to such an extent that it is sufficient to ensure the proper performance of the combustion device, such as preventing the combustion device from sucking excessive outer air or preventing rain water from entering into the combustion device.

In the exhaust tube holding member mentioned above, the outward protruding portion includes a first outward protruding member having an annular shape and a second outward protruding member having an annular shape. Thus, the exhaust pipe can be supported by both the first outward protruding member and the second outward protruding member. Thereby, the exhaust pipe can be supported more reliably. Further, since both the first outward protruding member and the second outward protruding member can seal the gap between the outward protruding portion and the inner peripheral surface of the exhaust pipe, the gap between the outward protruding portion and the inner peripheral surface of the exhaust pipe can be sealed more reliably.

In the exhaust tube holding member mentioned above, the first outward protruding member has an outer diameter larger than the outer diameter of the second outward protruding member, and the second outward protruding member is disposed closer to the first annular portion than the first outward protruding member. Thus, although the first outward protruding member deforms greater than the second outward protruding member relative to the first annular portion, it is still possible for the first outward protruding member to abut against the inner peripheral surface of the exhaust pipe. Thereby, it is possible to reliably seal the gap between the first outward protruding member and the inner peripheral surface of the exhaust pipe.

In the exhaust tube holding member mentioned above, in a cross section perpendicular to the radial direction of the outward protruding portion, the outer peripheral end of the first outward protruding member has a radius of curvature greater than the radius of curvature of the outer peripheral edge of the second outward protruding member, and the second outward protruding member is disposed closer to the first annular portion than the first outward protruding member. Therefore, in a state of abutting against the inner peripheral surface of the exhaust pipe, it is easier for the outer peripheral edge of the first outward protruding member to slide on the inner peripheral surface of the exhaust pipe than the outer peripheral edge of the second outward protruding member.

In the exhaust tube holding member mentioned above, the inward protruding portion is annular. Thus, as the inward protruding portion abuts against the outer peripheral surface of the exhaust pipe, a gap between the inward protruding portion and the outer peripheral surface of the exhaust pipe can be sealed.

In the exhaust tube holding member mentioned above, the inward protruding portion includes a first inward protruding member having an annular shape and a second inward protruding member having an annular shape. Thus, the exhaust pipe can be supported by both the first inward protruding member and the second inward protruding member. Thereby, the exhaust pipe can be supported more reliably. Further, since both the first inward protruding member and the second inward protruding member can seal the gap between the inward protruding portion and the outer peripheral surface of the exhaust pipe. Therefore, the gap between the inward protruding portion and the outer peripheral surface of the exhaust pipe can be sealed more reliably.

In the exhaust tube holding member mentioned above, the first inward protruding member has an inner diameter smaller than the inner diameter of the second inward protruding member, and the second inward protruding member is disposed closer to the first annular portion than the first inward protruding member. Thus, although the first inward protruding member deforms greater than the second inward protruding member relative to the first annular portion, it is still possible for the first inward protruding member to abut against the outer peripheral surface of the exhaust pipe. Thereby, it is possible to reliably seal the gap between the first outward protruding member and the inner peripheral surface of the exhaust pipe.

In the exhaust tube holding member mentioned above, in a cross section perpendicular to the radial direction of the inward protruding portion, the inner peripheral end of the first inward protruding member has a radius of curvature greater than the radius of curvature of the inner peripheral edge of the second inward protruding member, and the second inward protruding member is disposed closer to the first annular portion than the first inward protruding member. Therefore, in a state of abutting against the outer peripheral surface of the exhaust pipe, it is easier for the inner peripheral edge of the first inward protruding member to slide on the outer peripheral surface of the exhaust pipe than the inner peripheral edge of the second inward protruding member.

In the exhaust tube holding member mentioned above, the inward protruding portion has an inner diameter smaller than the inner diameter of the first through hole. Therefore, it is possible for the inner peripheral surface of the inward protruding portion to abut against the outer peripheral surface of the exhaust tube which is held inside the first through hole. Thereby, the peripheral surface of the exhaust tube can be held by the inward protruding portion.

The exhaust tube holding member mentioned above further includes a flange portion configured to extend peripherally outward from the outer peripheral surface of at least one of the first annular portion and the second annular portion and to abut against an upper end of the exhaust pipe located outside the building. Thus, it is possible for the flange portion to prevent outside air from intruding into a gap between the exhaust tube and the upper end of the exhaust pipe located outside the building. Thereby, the outside air can be prevented from intruding into the exhaust pipe.

In the exhaust tube holding member mentioned above, the outward protruding portion includes a first outward protruding piece and a second outward protruding piece. Thereby, the outward protruding portion can be supported by the exhaust pipe through the first outward protruding piece and the second outward protruding piece at plural locations.

In the exhaust tube holding member mentioned above, the inward protruding portion includes a first inward protruding piece and a second inward protruding piece. Thereby, the inward protruding portion can be supported by the exhaust pipe through the first inward protruding piece and the second inward protruding piece at plural locations.

The exhaust structure for combustion device of the present invention includes an exhaust tube holding member, an exhaust pipe, an exhaust pipe, and a rain cap. The exhaust tube holding member is any exhaust tube holding member mentioned in the above. The exhaust tube has one end and the other end, and is connected to the combustion apparatus at one end. The exhaust tube is introduced inside the exhaust pipe. The rain cap is connected to the other end of the exhaust tube and is configured to cover the top of the exhaust tube holding member. The first annular portion of the exhaust tube holding member is attached to the outer peripheral surface of the exhaust tube, and the flange portion is held at the upper end of the exhaust pipe. The outer peripheral end of the outward protruding portion abuts against the inner peripheral surface of the exhaust pipe, or the inner peripheral end of the inward protruding portion abuts against the outer peripheral surface of the exhaust pipe.

According to the combustion device exhaust structure of the present invention, it is possible to use a single exhaust tube holding member to deal with various exhaust pipes of different sizes. Further, since the top of the exhaust tube holding member is covered by the rain cap, the moisture such as rain water can be prevented from entering into the exhaust pipe from an inter-surface gap between the inner peripheral surface of the first through hole formed in the exhaust tube holding member and the outer peripheral surface of the exhaust tube.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings.

Firstly, an exhaust structure for combustion apparatus according to an embodiment of the present invention will be described.

Figure 1:
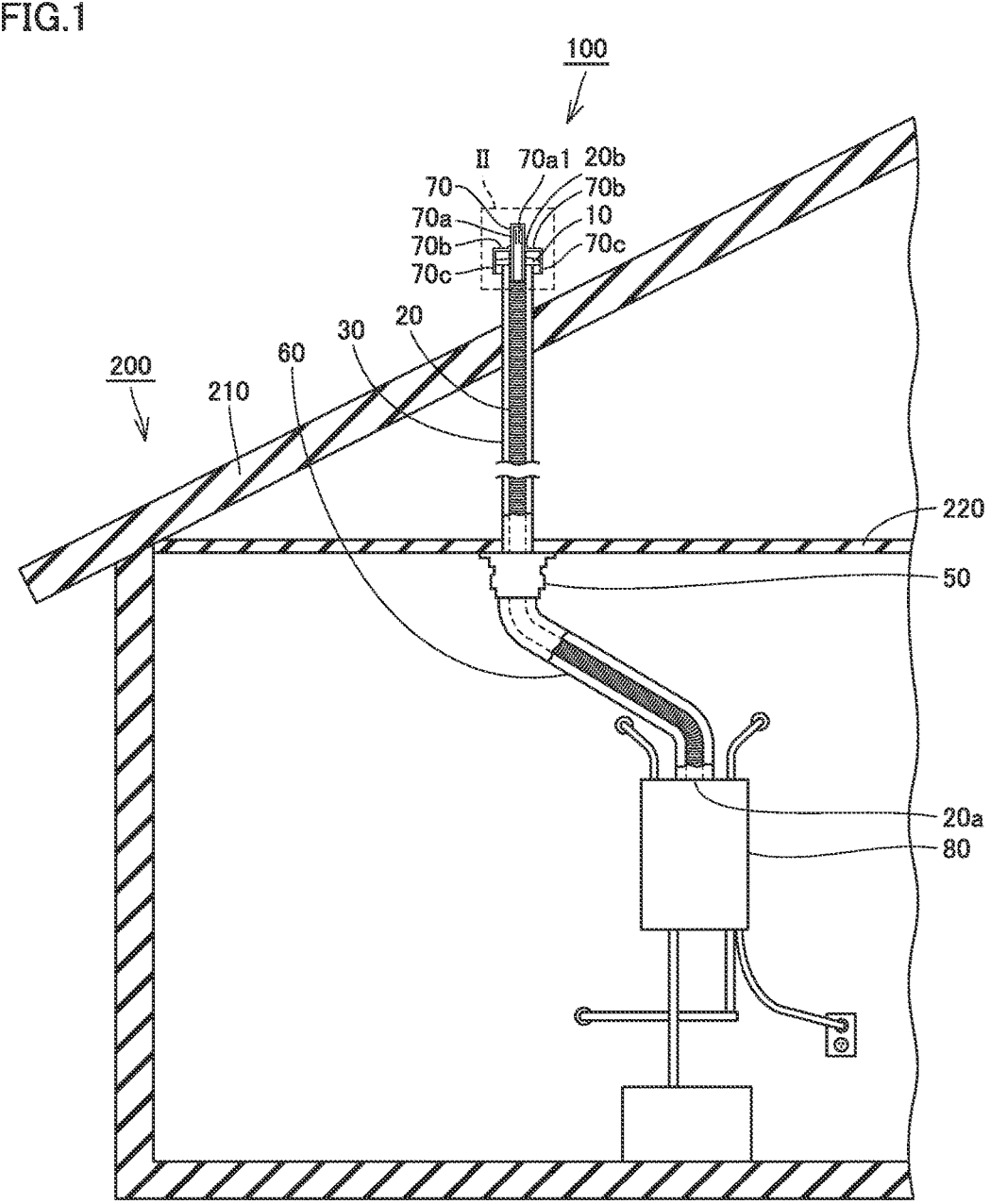
FIG. 1 is a planar view schematically illustrating an exhaust structure for combustion apparatus which has been installed in a building according to an embodiment of the present invention.

As illustrated in FIG. 1, an exhaust structure for combustion apparatus 100 of the present embodiment generally includes a combustion apparatus 80, an exhaust tube holding member 10, an exhaust tube (flexible exhaust pipe) 20, an exhaust pipe (B-vent) 30, an exhaust tube fixing member 50, a connection pipe 60, and a rain cap (exhaust terminal) 70. Exhaust structure for combustion apparatus 100 is configured to emit combustion gas produced by combustion apparatus 80 to the outside of a building 200.

Combustion apparatus 80 is installed inside building 200. Combustion apparatus 80 may be a water heater for heating water to hot with combustion gas or may be any other combustion apparatus such as a room heater for warming up a room with combustion gas. In the case where a water heater is used as combustion apparatus 80, the water heater may be a water heater adapted to an exhaust suction and combustion system or may be a water heater of a latent heat recovery type.

Exhaust tube 20 has one end 20a and the other end 20b. Exhaust tube 20 is connected to combustion apparatus 80 at one end 20a. The other end 20b of exhaust tube 20 extends out to the outside of the building. The interior of exhaust tube 20 forms a discharge path for discharging the exhaust gas generated from combustion in combustion apparatus 80 to the outside. Thus, the exhaust gas produced by combustion apparatus 80 can be guided to the outside through exhaust tube 20.

Exhaust tube 20 is implemented as a flexible pipe such as an accordion pipe, it may be a spiral pipe as well. Thereby, it is possible for exhaust tube 20 to follow the shape of exhaust pipe 30 even it is complicated. Based on the fact that the exhaust gas will pass through the interior of exhaust tube 20, it is preferred that exhaust tube 20 is made from a material having acid resistance. As described in the present embodiment, in the case where combustion apparatus 80 is a water heater of a latent heat recovery type, the exhaust gas may be discharged together with acidic drainage water.

Thus, the material of exhaust tube 20 may be selected from materials having acid resistance such as phenol resin, epoxy resin, silicone resin, fluorine resin such as tetrafluoroethylene, unsaturated polyester resin, melamine resin, polycarbonate resin, methacryl styrene (MS) resin, methacryl resin, styrene acrylonitrile copolymer (AS) resin, ABS resin, polyethylene, polypropylene, polystyrene, polyethylene terephthalate (PET), and vinyl chloride resin.

Exhaust pipe 30 is attached to building 200 so as to extend from the indoor to the outdoor through a roof 210 of building 200, for example. Exhaust pipe 30 may extend from the indoor to the outdoor through a wall of the building. Exhaust pipe 30 is made of metal, for example. Exhaust pipe 30 has a larger diameter than exhaust tube 20. Exhaust tube 20 is inserted into exhaust pipe 30. Specifically, a part of exhaust tube 20 closer to the other end 20b is inserted into exhaust pipe 30. Exhaust pipe 30 has a cross section (orthogonal to the axis direction of exhaust pipe 30) having a circular shape, an oval shape or an elliptical shape, for example. Exhaust pipe 30 is connected to exhaust tube fixing member 50 at the lower end. Note that exhaust pipe 30 is not required to be connected to exhaust tube fixing member 50.

Exhaust tube fixing member 50 is configured to fix exhaust tube 20 relative to exhaust pipe 30. In the case where exhaust tube fixing member 50 is connected to exhaust pipe 30, exhaust tube fixing member 50 is configured to fix exhaust tube 20 relative to exhaust pipe 30. In the present embodiment, exhaust tube fixing member 50 is attached to exhaust pipe 30 at a location closer to combustion apparatus 80 than to exhaust tube holding member 10. In addition, exhaust tube fixing member 50 fixes connection pipe 60 to exhaust pipe 30. It is preferable to fix exhaust tube fixing member 50 to a ceiling 220 of building 200 after it is fixed to both exhaust tube 20 and exhaust pipe 30. Exhaust tube fixing member 50 is preferably made of the same material as exhaust tube 20.

Figure 2:
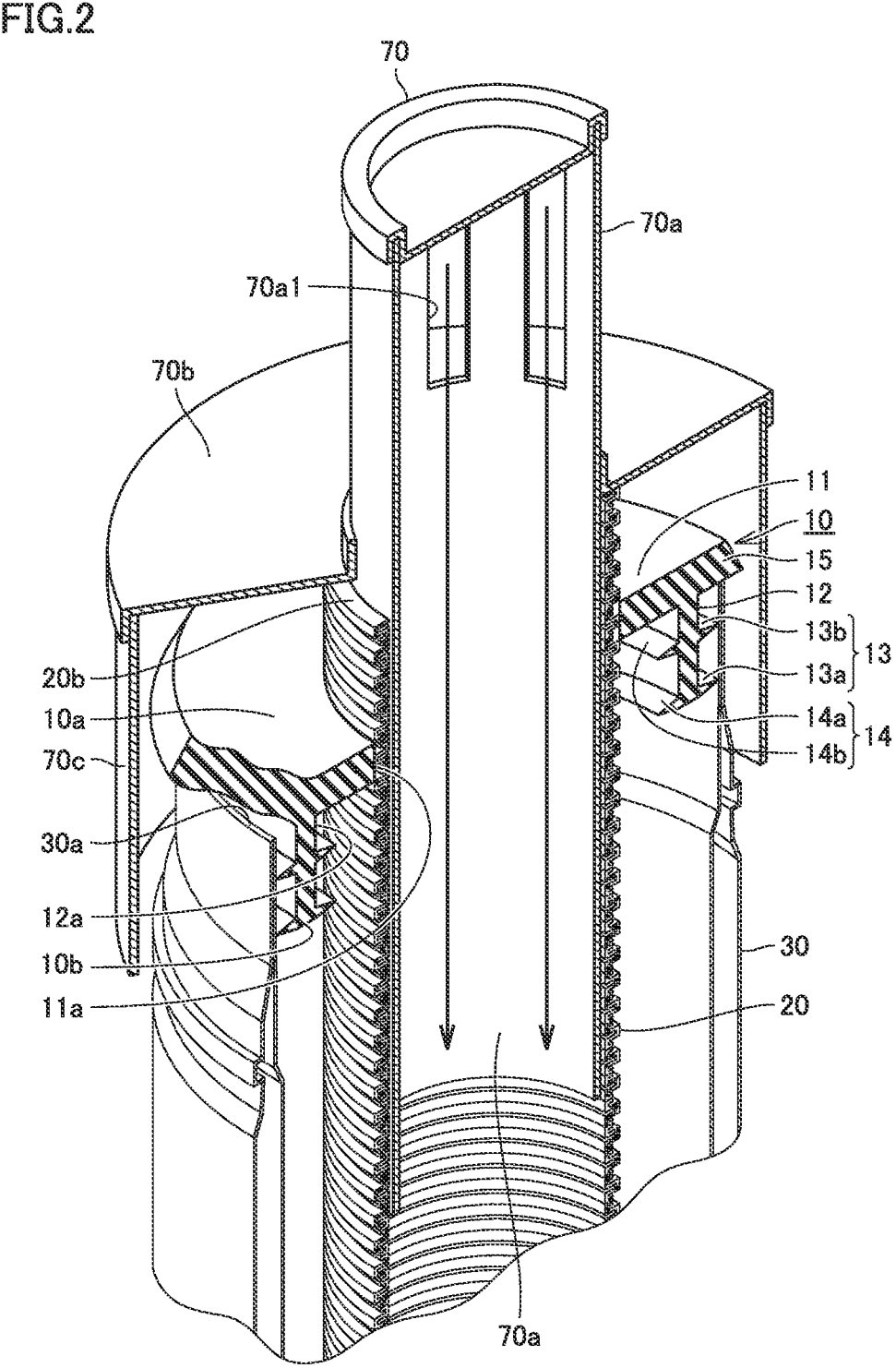
FIG. 2 is a cross-sectional perspective view of a region II in FIG. 1 for the purpose of illustrating how an exhaust tube holding member included in the exhaust structure for combustion apparatus according to an embodiment of the present invention is used to hold an exhaust tube inside an exhaust pipe of a relatively large diameter.

As illustrated in FIG. 2, rain cap 70 includes a discharge member 70a and cover members 70b and 70c. Discharge member 70a has for example a cylindrical shape, and is attached to the other end 20b of exhaust tube 20. Specifically, discharge member 70a is inserted into exhaust tube 20 from the other end 20b of exhaust tube 20, and is thereby attached to exhaust tube 20. The outer diameter of discharge member 70a is set larger than the inner diameter of exhaust tube 20. Thus, after discharge member 70a is inserted into exhaust tube 20, the inner diameter of exhaust tube 20 is expanded thereby, and thus exhaust tube 20 shrinks so as to reduce the expanded diameter, and the shrinking force helps to support discharge member 70a inside exhaust tube 20.

An exhaust vent (discharge unit) 70a1 for discharging the exhaust gas after combustion to the outside (outdoor) is formed at the upper end of discharge member 70a. With the help of exhaust vent 70a1, it is possible to emit the exhaust gas guided by exhaust tube 20 to the outside of building 200 through rain cap 70.

Cover members 70b and 70c of rain cap 70 cover the top surface and the side surface of exhaust tube holding member 10. Cover members 70b and 70c include a ceiling 70b and a peripheral wall 70c. Ceiling 70b has a circular ring shape extending from the outer peripheral surface of discharge member 70a outward circumferentially. Ceiling 70b has an outer diameter larger than the outer diameter of exhaust tube holding member 10 and covers the top of exhaust tube holding member 10. Peripheral wall 70c has a cylindrical shape extending downward from the outer peripheral end of ceiling 70b. A gap may be formed between the inner peripheral surface of peripheral wall 70c and the outer peripheral surface of exhaust tube holding member 10. Note that the inner peripheral surface of peripheral wall 70c may be in contact with the outer peripheral surface of exhaust tube holding member 10. Peripheral wall 70c covers the side surface of exhaust tube holding member 10.

In the above, discharge member 70a of rain cap 70 is implemented as an inner cover attached to the inner peripheral surface of exhaust tube 20, it may be an outer cover attached to the outer peripheral surface of exhaust tube 20. Rain cap 70 may be made of materials such as aluminum and stainless steel.

As illustrated in FIG. 1, connection pipe 60 is configured to cover exhaust tube 20 and thereby protect exhaust tube 20. Connection pipe 60 is connected to exhaust tube fixing member 50 and combustion apparatus 80. Connection pipe 60 has a larger outer diameter than exhaust tube 20. A part of exhaust tube 20 closer to the other end 20b is inserted inside connection pipe 60.

Connection pipe 60 is implemented as a flexible pipe such as an accordion pipe, it may be a spiral pipe as well. Since connection pipe 60 is flexible, it is possible for connection pipe 60 to follow the shape of exhaust tube 20 easily. Moreover, since connection pipe 60 is flexible, it is easier to connect connection pipe 60 to combustion apparatus 80.

Connection pipe 60 may be a pipe made of for example aluminum. As a result, it is possible to reduce the self weight so as to reduce the load for exhaust tube fixing member 50 to support connection pipe 60, and meanwhile since aluminum has a certain degree of hardness, it is possible to prevent connection pipe 60 from deformation due to its self weight. Furthermore, since a pipe made of aluminum can be relatively readily processed through cutting or the like, it can be readily adapted to the length of exhaust tube 20, for example.

As illustrated in FIGS. 1 and 2, exhaust tube holding member 10 is supported by exhaust pipe 30 extending from the inside to the outside of building 200. Exhaust tube holding member 10 supports, on its inner peripheral surface, exhaust tube 20 that is inserted into exhaust pipe 30. In other words, exhaust tube holding member 10 is configured to hold exhaust tube 20, which is connected to combustion apparatus 80, inside exhaust pipe 30. Furthermore, exhaust tube holding member 10 serves to occlude a gap formed between exhaust tube 20 and exhaust pipe 30 located outside the building. It is preferable that exhaust tube holding member 10 is made of a material having acidic resistance. The material of exhaust tube holding member 10 can be made of a material having acidic resistance such as phenol resin, epoxy resin, silicone resin, fluorine resin such as polytetrafluoroethylene, unsaturated polyester resin, melamine resin, polycarbonate resin, methacryl styrene (MS) resin, methacryl resin, styrene acrylonitrile copolymer (AS) resin, ABS resin, polyethylene, polypropylene, polystyrene, polyethylene terephthalate (PET), and vinyl chloride resin, for example.

Figure 3:
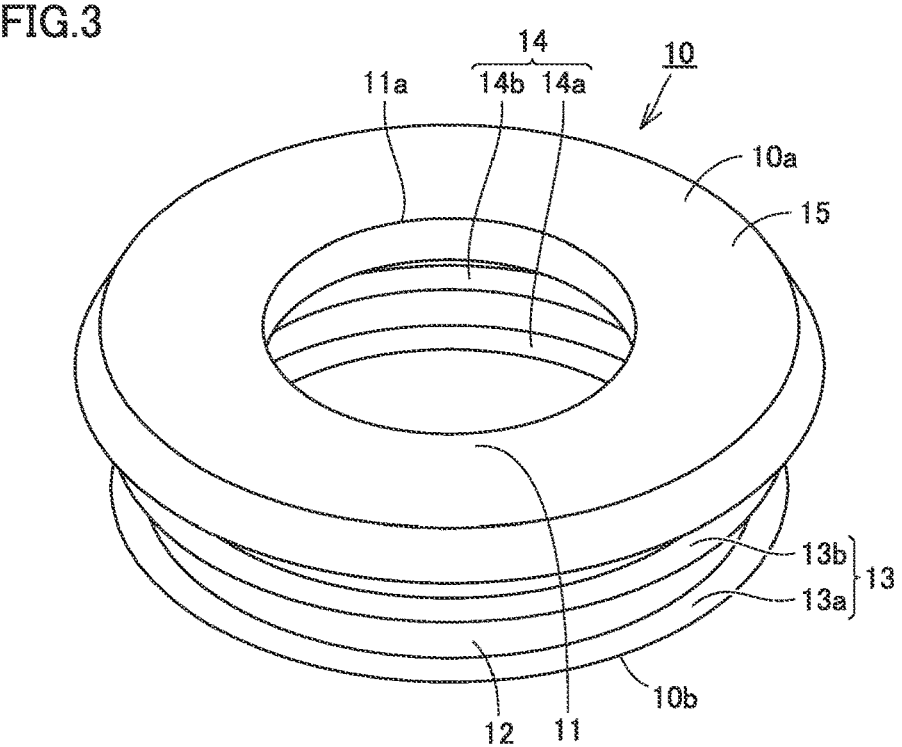
FIG. 3 is a perspective view schematically illustrating the configuration of the exhaust tube holding member of FIG. 2 when viewed from the side of the upper surface of the exhaust tube holding member.

Hereinafter, the configuration of exhaust tube holding member 10 mentioned above will be described in more detail with reference to FIGS. 2 to 7. As illustrated in FIGS. 2 and 3, exhaust tube holding member 10 has a first end 10a and a second end 10b facing each other, and is formed with a through hole penetrating from first end 10a to second end 10b. Exhaust tube holding member 10 is formed into an annular body enclosing therein the through hole. Exhaust tube holding member 10 includes a first annular portion 11, a second annular portion 12, an outward protruding portion 13, an inward protruding portion 14, and a flange portion 15. Each of first annular portion 11, second annular portion 12, outward protruding portion 13, inward protruding portion 14 and flange portion 15 is formed to have for example a circular shape, an oval shape or an elliptical shape in response to the sectional shape of exhaust pipe 30. Exhaust tube holding member 10 is made of an elastic material. It is acceptable that only a portion corresponding to the inner peripheral surface of exhaust tube holding member 10, outward protruding portion 13 and inward protruding portion 14 are made of an elastic material.

First annular portion 11 includes first end 10a of exhaust tube holding member 10. First annular portion 11 is formed with a first through hole 11a. First annular portion 11 is configured to abut against the outer peripheral surface of exhaust tube 20 through first through hole 11a. First annular portion 11 is attached to the outer peripheral surface of exhaust tube 20.

Second annular portion 12 includes second end 10b of exhaust tube holding member 10. Second annular portion 12 is connected to first annular portion 11. Second annular portion 12 is formed with a second through hole 12a. Second through hole 12a is in communication with first through hole 11a. Second through hole 12a has an inner diameter larger than the inner diameter of first through hole 11a.

First through hole 11a and second through hole 12a constitute the through hole penetrating from first end 10a of exhaust tube holding member 10 to second end 10b thereof. First through hole 11a and second through hole 12a penetrate through exhaust tube holding member 10 along the direction where first annular portion 11 and second annular portion 12 are connected to each other.

Figure 4:
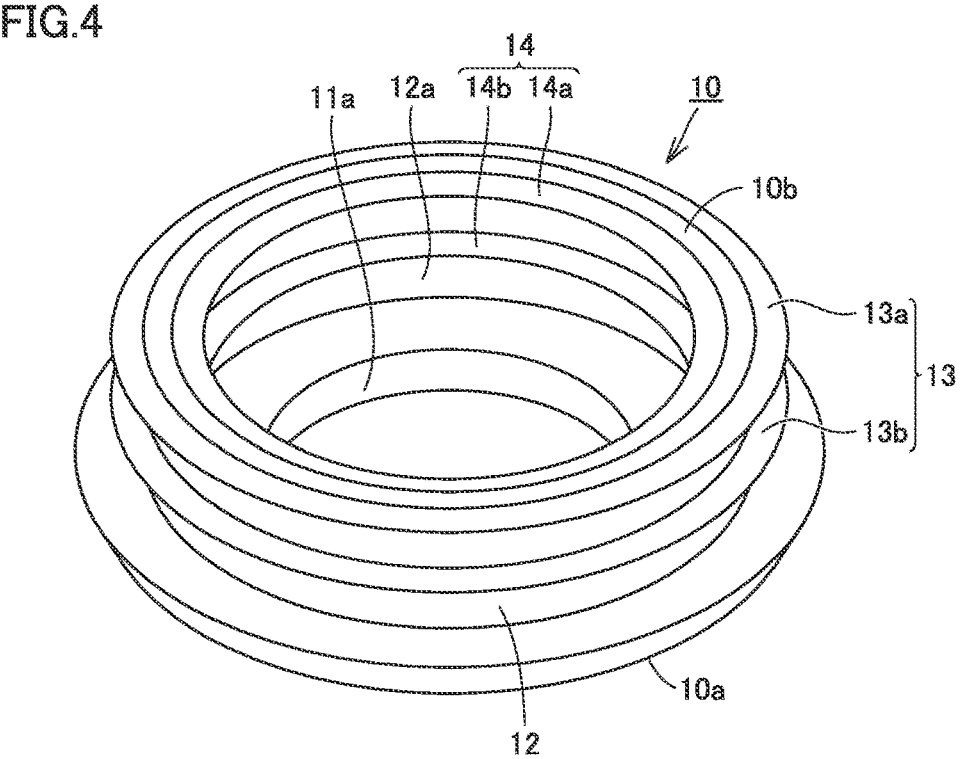
FIG. 4 is a perspective view schematically illustrating the configuration of the exhaust tube holding member of FIG. 2 when viewed from the side of the lower surface of the exhaust tube holding member.

As illustrated in FIGS. 2 to 4, outward protruding portion 13 protrudes peripherally outward from the outer peripheral surface of second annular portion 12. Outward protruding portion 13 is supported by exhaust pipe 30. Specifically, outward protruding portion 13 is formed into an annular shape. Outward protruding portion 13 protrudes peripherally outward from the outer peripheral surface of second annular portion 12 along the entire circumference. Outward protruding portion 13 is formed to have a tapered shape. Specifically, outward protruding portion 13 is configured to have a width reducing toward the outer peripheral edge thereof. In other words, the cross-sectional area of outward protruding portion 13 is configured to reduce continuously as outward protruding portion 13 extends outward from the outer peripheral surface of second annular portion 12. The tapered shape of outward protruding portion 13 is formed by an upper inclined surface and a lower inclined surface. The outer peripheral edge of outward protruding portion 13 may be sharpened or may be round without being sharpened. Outward protruding portion 13 is configured to abut against the inner peripheral surface of exhaust pipe 30 having a relatively large diameter (for example, 4 inches).

Outward protruding portion 13 includes a first outward protruding member 13a and a second outward protruding member 13b. First outward protruding member 13a is formed into an annular shape. Second outward protruding member 13b is formed into an annular shape. First outward protruding member 13a and second outward protruding member 13b have the same outer diameter. Second outward protruding member 13b is disposed closer to first annular portion 11 than first outward protruding member 13a.

Inward protruding portion 14 protrudes peripherally inward from the inner peripheral surface of second annular portion 12. Inward protruding portion 14 is supported by exhaust pipe 30. Specifically, inward protruding portion 14 is formed into an annular shape. Inward protruding portion 14 protrudes peripherally inward from the inner peripheral surface of second annular portion 12 along the entire circumference. Inward protruding portion 14 is formed to have a tapered shape. Specifically, inward protruding portion 14 is configured to have a width reducing toward the inner peripheral edge. In other words, the cross-sectional area of inward protruding portion 14 is configured to reduce continuously as inward protruding portion 14 extends inward from the inner peripheral surface of second annular portion 12. The tapered shape of inward protruding portion 14 is formed by an upper inclined surface and a lower inclined surface. The outer peripheral edge of inward protruding portion 14 may be sharpened or may be round without being sharpened. Inward protruding portion 14 is configured to abut against the outer peripheral surface of exhaust pipe 30 having a relatively small diameter (for example, 3 inches).

Inward protruding portion 14 includes a first inward protruding member 14a and a second inward protruding member 14b. First inward protruding member 14a is formed into an annular shape. Second inward protruding member 14b is formed into an annular shape. First inward protruding member 14a and second inward protruding member 14b have the same inner diameter. Second inward protruding member 14b is disposed closer to first annular portion 11 than first inward protruding member 14a.

Flange portion 15 is formed to have an annular shape. Flange portion 15 extends peripherally outward from the outer peripheral surface of at least one of first annular portion 11 and second annular portion 12. In the present embodiment, flange portion 15 extends peripherally outward from the outer peripheral surface of first annular portion 11. Flange portion 15 protrudes peripherally outward from the outer peripheral surface of first annular portion 11 along the entire circumference. Flange portion 15 protrudes toward the side of the outer peripheral edge of first annular portion 11 greater than outward protruding portion 13.

Figure 5:
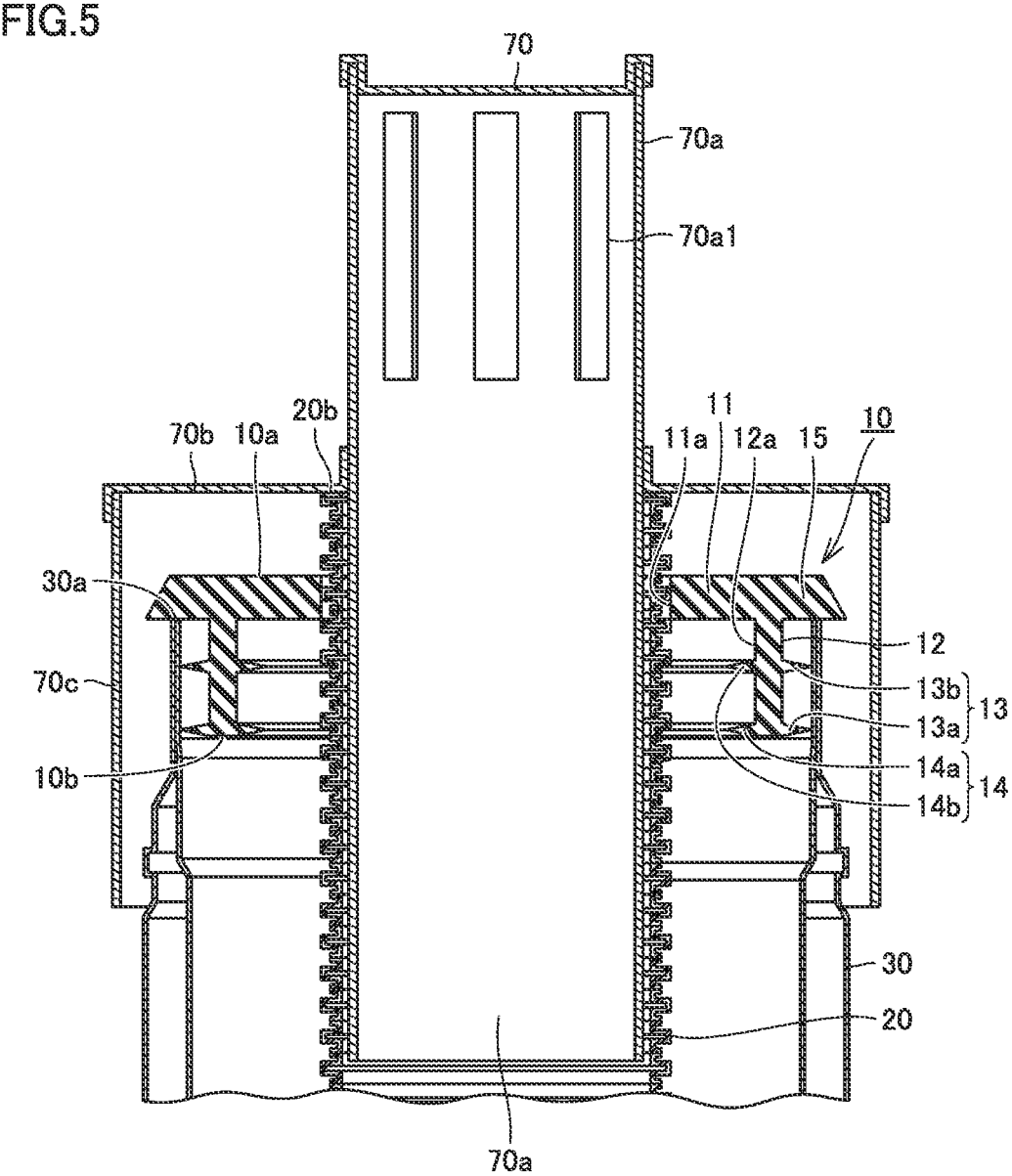
FIG. 5 is a sectional view corresponding to the cross-sectional perspective view illustrated in FIG. 2.

As illustrated in FIG. 5, flange portion 15 is larger in outer diameter than exhaust pipe 30. Flange portion 15 abuts against an upper end 30a of exhaust pipe 30 located outside the building so as to occlude the gap between exhaust pipe 30 and exhaust tube 20. Flange portion 15 is formed to extend peripherally outward greater than the outer peripheral surface of upper end 30a of exhaust pipe 30 along the entire circumference. Thereby, the gap between upper end 30a of exhaust pipe 30 and exhaust tube 20 can be occluded. Flange portion 15 is configured to have an outer diameter larger than both the relatively small outer diameter (for example, 3 inches) of exhaust pipe 30 and the relatively large outer diameter (for example, 4 inches) of exhaust pipe 30.

First annular portion 11 of exhaust tube holding member 10 is configured to be fitted on the outer peripheral surface of exhaust tube 20 so that the inner peripheral surface of first annular portion 11 presses against the outer peripheral surface of exhaust tube 20. Specifically, before first annular portion 11 is fitted around the outer peripheral surface of exhaust tube 20, the inner diameter of first annular portion 11 is sized equal to or smaller than the outer diameter of exhaust tube 20. As described in the above, the portion corresponding to the inner peripheral surface of first annular portion 11 is made of an elastic material.

Thus, while the portion corresponding to the inner peripheral surface of exhaust tube holding member 10 is being elastically deformed so as to increase the inner diameter of first annular portion 11, exhaust tube holding member 10 can be fitted on the outer peripheral surface of exhaust tube 20, and after that, the portion corresponding to the inner peripheral surface of first annular portion 11 will restore its original shape. While first annular portion 11 is being fitted on the outer peripheral surface of exhaust tube 20, the restoration feature of the elastic material of the portion corresponding to the inner peripheral surface of first annular portion 11 causes the inner peripheral surface of first annular portion 11 to press against the outer peripheral surface of exhaust tube 20.

Furthermore, exhaust tube holding member 10 is configured to be fitted into exhaust pipe 30 so that outward protruding portion 13 (each of first outward protruding member 13a and second outward protruding member 13b) presses against the inner peripheral surface of exhaust pipe 30. Specifically, second annular portion 12 has an outer diameter smaller than the inner diameter of exhaust pipe 30. after second annular portion 12 is inserted into exhaust pipe 30, outward protruding portion 13 (each of first outward protruding member 13a and second outward protruding member 13b) formed on second annular portion 12 presses against the inner peripheral surface of exhaust pipe 30. Before exhaust tube holding member 10 is fitted into exhaust pipe 30, the outer diameter of outward protruding portion 13 (each of first outward protruding member 13a and second outward protruding member 13b) formed on second annular portion 12 is sized equal to or greater than the inner diameter of exhaust pipe 30. As described in the above, outward protruding portion 13 (each of first outward protruding member 13a and second outward protruding member 13b) formed on second annular portion 12 is made of an elastic material.

Thus, while outward protruding portion 13 (each of first outward protruding member 13a and second outward protruding member 13b) formed on second annular portion 12 is being elastically deformed so as to decrease the outer diameter of outward protruding portion 13 (each of first outward protruding member 13a and second outward protruding member 13b), second annular portion 12 can be inserted into exhaust pipe 30, and after that, outward protruding portion 13 (each of first outward protruding member 13a and second outward protruding member 13b) will restore its original shape. While exhaust tube holding member 10 is being fitted on the inner peripheral surface of exhaust pipe 30, the restoration feature of the elastic material of outward protruding portion 13 (each of first outward protruding member 13a and second outward protruding member 13b) causes outward protruding portion 13 (each of first outward protruding member 13a and second outward protruding member 13b) to press against the inner peripheral surface of exhaust pipe 30.

Although in the above the description has been carried out with regard to the case where exhaust tube holding member 10 is used for exhaust pipe 30 with a relatively large diameter (for example, 4 inches), exhaust tube holding member 10 can also be used for exhaust pipe 30 with a relatively small diameter (for example, 3 inches). Hereinafter, the description will be carried out with regard to the case where exhaust tube holding member 10 is used for exhaust pipe 30 with a relatively small diameter (for example, 3 inches).

Figure 6:
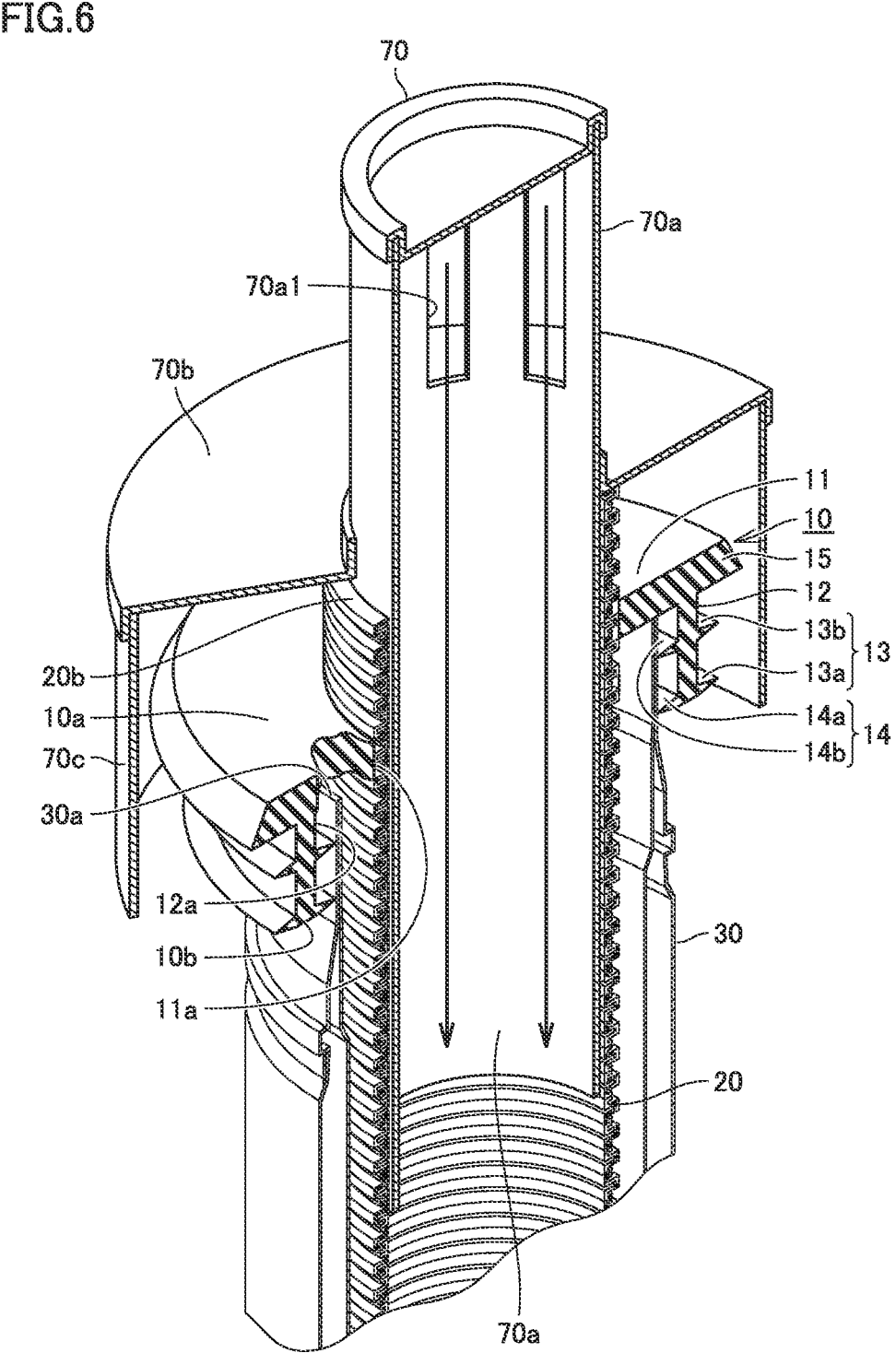
FIG. 6 is a cross-sectional perspective view of a region II in FIG. 1 for the purpose of illustrating how an exhaust tube holding member included in the exhaust structure for combustion apparatus according to an embodiment of the present invention is used to hold an exhaust tube inside an exhaust pipe of a relatively small diameter.
Figure 7:
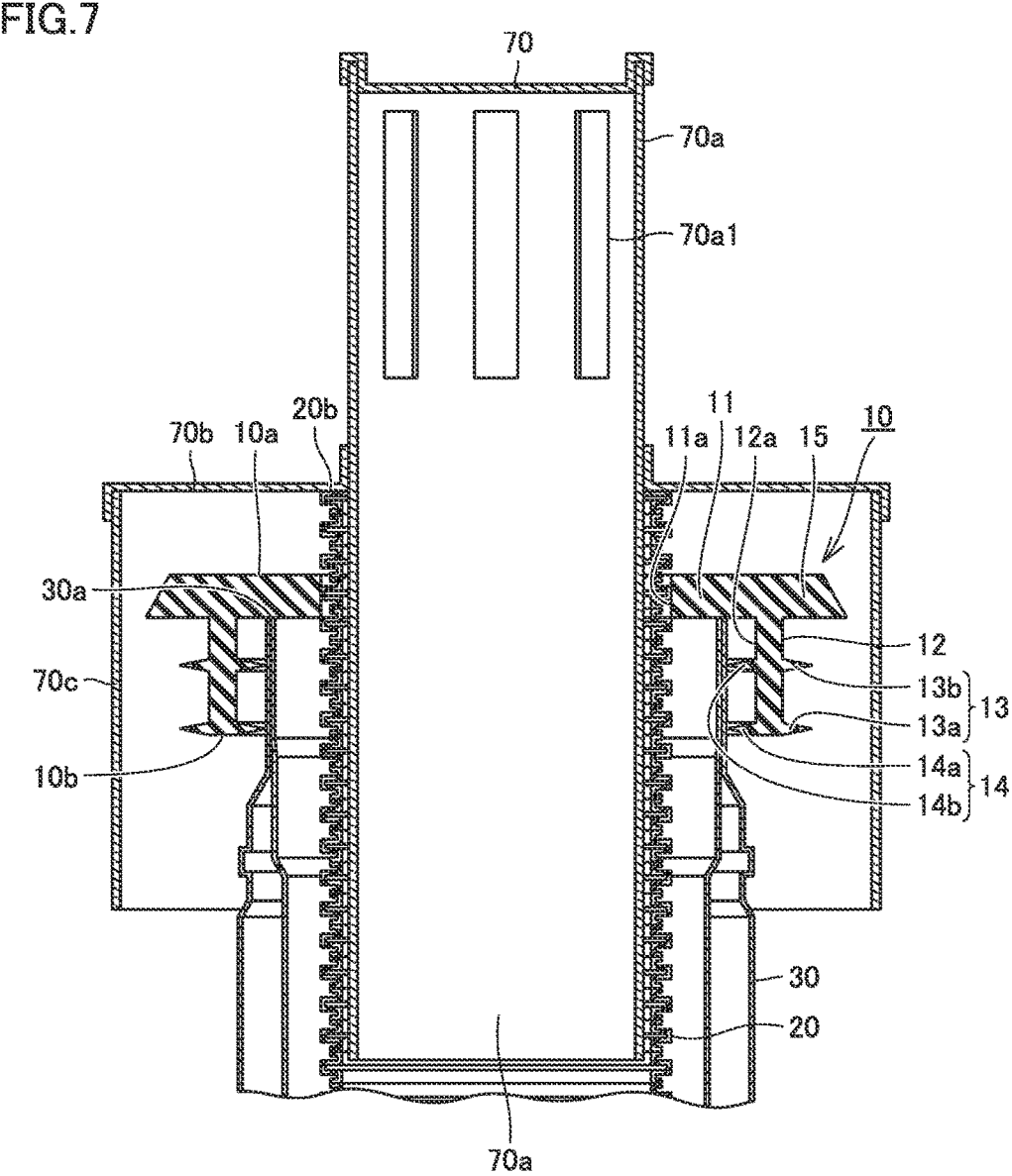
FIG. 7 is a sectional view corresponding to the cross-sectional perspective view illustrated in FIG. 6.

As illustrated in FIGS. 6 and 7, exhaust tube holding member 10 is configured to be fitted on exhaust pipe 30 so that inward protruding portion 14 (each of first inward protruding member 14a and second inward protruding member 14b) presses against the outer peripheral surface of exhaust pipe 30. Specifically, second annular portion 12 has an outer diameter larger than the outer diameter of exhaust pipe 30. after second annular portion 12 is inserted into exhaust pipe 30, inward protruding portion 14 (each of first inward protruding member 14a and second inward protruding member 14b) formed on second annular portion 12 presses against the outer peripheral surface of exhaust pipe 30. Before exhaust tube holding member 10 is fitted into exhaust pipe 30, the inner diameter of inward protruding portion 14 (each of first inward protruding member 14a and second inward protruding member 14b) formed on second annular portion 12 is sized equal to or smaller than the outer diameter of exhaust pipe 30. Furthermore, as described in the above, inward protruding portion 14 (each of first inward protruding member 14a and second inward protruding member 14b) formed on second annular portion 12 is made of an elastic material.

Thus, while inward protruding portion 14 (each of first inward protruding member 14a and second inward protruding member 14b) formed on second annular portion 12 is being elastically deformed so as to decrease the inner diameter of inward protruding portion 14 (each of first inward protruding member 14a and second inward protruding member 14b), exhaust pipe 30 can be inserted into second annular portion 12, and after that, inward protruding portion 14 (each of first inward protruding member 14a and second inward protruding member 14b) will restore its original shape. While exhaust tube holding member 10 is being fitted on the outer peripheral surface of exhaust pipe 30, the restoration feature of the elastic material of inward protruding portion 14 (each of first inward protruding member 14a and second inward protruding member 14b) causes inward protruding portion 14 (each of first inward protruding member 14a and second inward protruding member 14b) to press against the outer peripheral surface of exhaust pipe 30.

As described in the above, outward protruding portion 13 is used in the case where exhaust pipe 30 has a relatively large diameter (for example, 4 inches) and inward protruding portion 14 is used in the case where exhaust pipe 30 has a relatively small diameter (for example, 3 inches), and thereby one exhaust tube holding member 10 can be used to deal with various exhaust pipes 30 with different sizes (diameters).

Next, a first modification of the present invention will be described with reference to FIG. 8.

In the above, first outward protruding member 13a and second outward protruding member 13b have been described as having the same outer diameter, and however, first outward protruding member 13a may have an outer diameter larger than the outer diameter of second outward protruding member 13b. In the above, first inward protruding member 14a and second inward protruding member 14b have been described as having the same inner diameter, and however, first inward protruding member 14a may have an inner diameter smaller than the inner diameter of second inward protruding member 14b.

Figure 8:
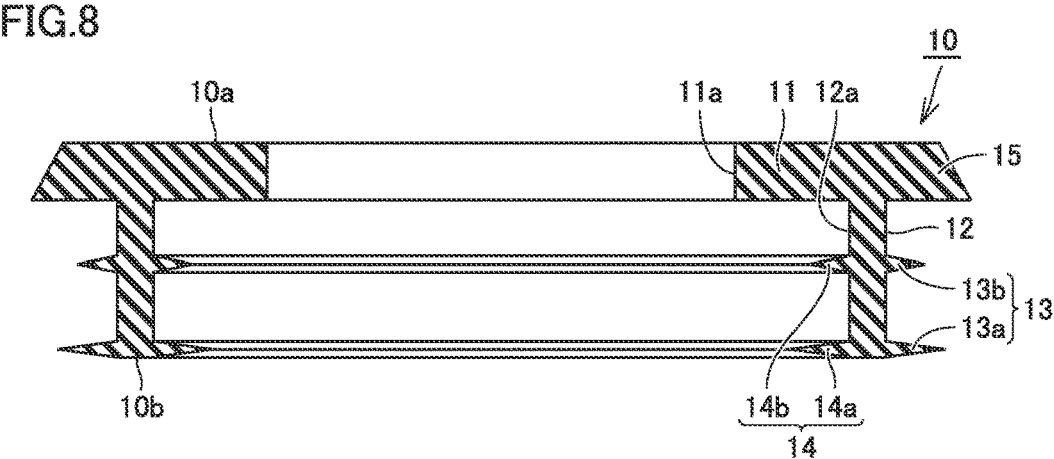
FIG. 8 is a sectional view illustrating the configuration of an exhaust tube holding member according to a first modification of an embodiment of the present invention.

In the first modification of the present invention, as illustrated in FIG. 8, first outward protruding member 13a has an outer diameter larger than the outer diameter of second outward protruding member 13b, and first outward protruding member 13a is disposed at a position apart from first annular portion 11 than second outward protruding member 13b. Thus, first outward protruding member 13a deforms greater than second outward protruding member 13b relative to first annular portion 11. Since first outward protruding member 13a has an outer diameter larger than the outer diameter of second outward protruding member 13b, even though first outward protruding member 13a deforms greater than second outward protruding member 13b relative to first annular portion 11, it is still possible for it to abut against the inner peripheral surface of exhaust pipe 30 illustrated in FIG. 5.

Further in the first modification of the present invention, first inward protruding member 14a has an inner diameter smaller than the inner diameter of second inward protruding member 14b, and first inward protruding member 14a is disposed at a position apart from first annular portion 11 than second inward protruding member 14b. Thus, first inward protruding member 14a deforms greater than second outward protruding member 13b relative to first annular portion 11. Since first inward protruding member 14a has an inner diameter smaller than the inner diameter of second inward protruding member 14b, even though first inward protruding member 14a deforms greater than second inward protruding member 14b relative to first annular portion 11, it is still possible for it to abut against the inner peripheral surface of exhaust pipe 30 illustrated in FIG. 7.

Next, a second modification of the present invention will be described with reference to FIGS. 9 and 10.

Figure 9:
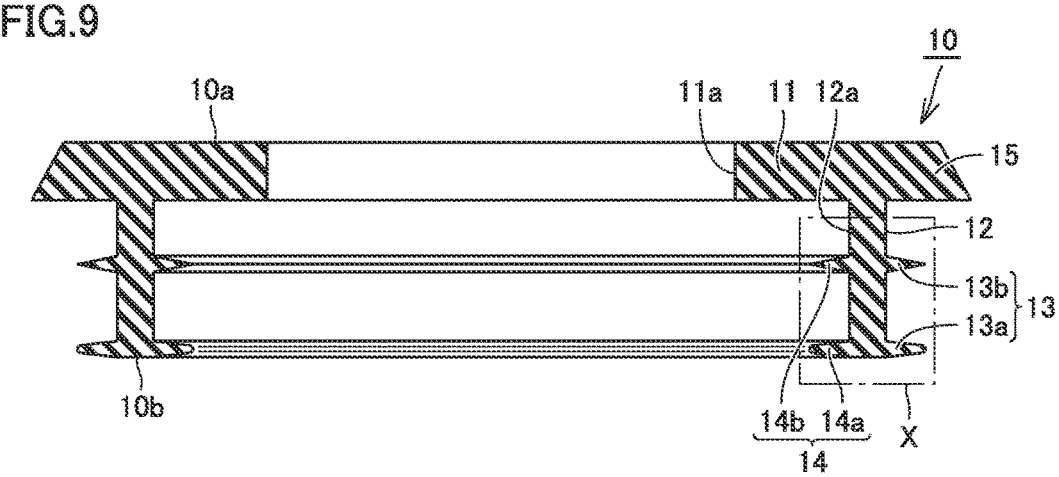
FIG. 9 is a sectional view illustrating the configuration of an exhaust tube holding member according to a second modification of an embodiment of the present invention.
Figure 10:
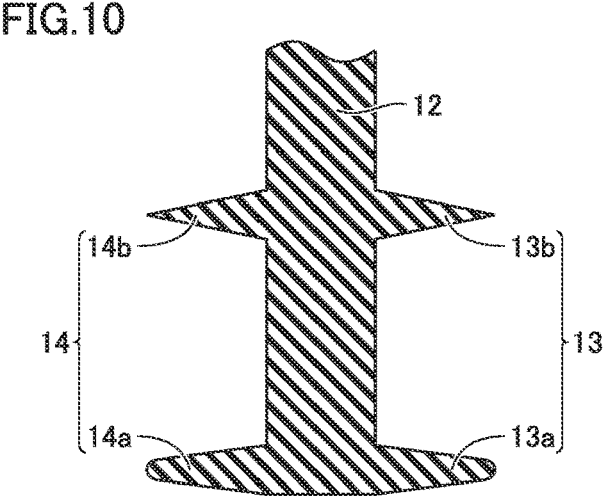
FIG. 10 is an enlarged view corresponding to a region X in FIG. 9.

In the second modification of the present invention, as illustrated in FIGS. 9 and 10, in a cross section perpendicular to the radial direction of outward protruding portion 13, the outer peripheral end of first outward protruding member 13a has a radius of curvature greater than that of the outer peripheral end of second outward protruding member 13b, and first outward protruding member 13a is disposed at a position apart from first annular portion 11 than second outward protruding member 13b. Therefore, when first outward protruding member 13a and second outward protruding member 13b are inserted into exhaust pipe 30 from upper end 30a of exhaust pipe 30 illustrated in FIG. 5, first outward protruding member 13a travels a longer distance than second outward protruding member 13b while abutting against the inner peripheral surface of exhaust pipe 30. Since the outer peripheral end of first outward protruding member 13a has a radius of curvature greater than that of the outer peripheral end of second outward protruding member 13b, it is possible for the outer peripheral end of first outward protruding member 13a to slide on the inner peripheral surface of exhaust pipe 30 easier than the outer peripheral end of second outward protruding member 13b, and thus, it is easier to insert the outer peripheral end of first outward protruding member 13a into exhaust pipe 30. Accordingly, it is possible to facilitate the insertion of both first outward protruding member 13a and second outward protruding member 13b into exhaust pipe 30.

Further in the second modification of the present invention, in a cross section perpendicular to the radial direction of inward protruding portion 14, the inner peripheral end of first inward protruding member 14a has a radius of curvature greater than that of second inward protruding member 14b, and first inward protruding member 14a is disposed at a position apart from first annular portion 11 than second inward protruding member 14b. Therefore, when exhaust pipe 30 illustrated in FIG. 7 is inserted into second annular portion 12 from upper end 30a, first inward protruding member 14a travels a longer distance than second inward protruding member 14b while abutting against the outer peripheral surface of exhaust pipe 30. Since the inner peripheral end of first inward protruding member 14a has a radius of curvature greater than that of the inner peripheral end of second inward protruding member 14b, it is possible for the inner peripheral end of first inward protruding member 14a to slide on the inner peripheral surface of exhaust pipe 30 easier than the inner peripheral end of second inward protruding member 14b, and thus, it is easier to pass exhaust pipe 30 through the inner peripheral end of first inward protruding member 14a. Accordingly, it is possible to facilitate the insertion of exhaust pipe 30 into both first inward protruding member 14a and second inward protruding member 14b.

Next, a third modification of the present invention will be described with reference to FIGS. 11 and 12.

Figure 11:
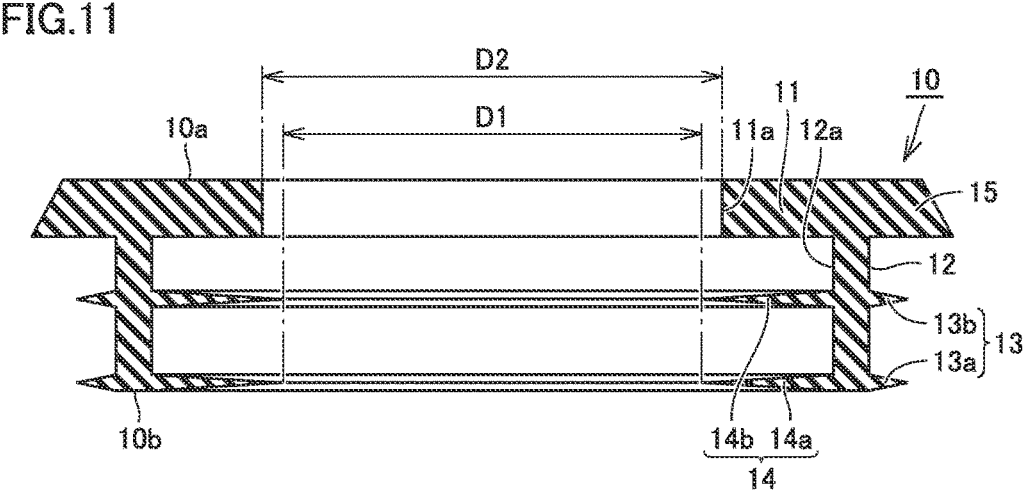
FIG. 11 is a sectional view illustrating the configuration of an exhaust tube holding member according to a third modification of an embodiment of the present invention.
Figure 12:
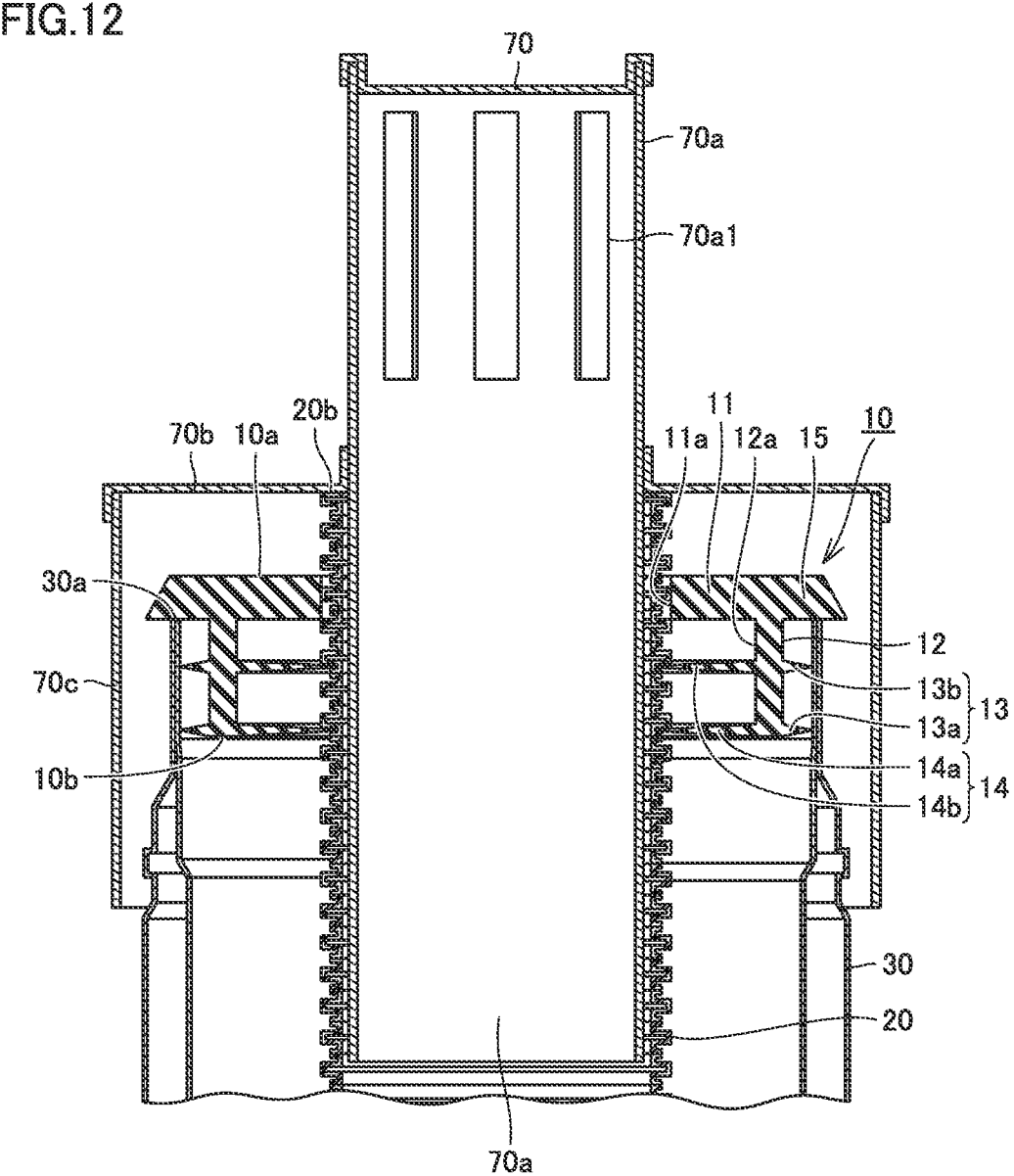
FIG. 12 is a sectional view corresponding to FIG. 5 for the purpose of illustrating how the exhaust tube holding member according to the third modification of an embodiment of the present invention is used to hold an exhaust tube inside an exhaust pipe of a relatively large diameter.

In the third modification of the present invention, as illustrated in FIGS. 11 and 12, inward protruding portion 14 has an inner diameter smaller than the inner diameter of first through hole 11a. In other words, the inner peripheral end of inward protruding portion 14 is positioned radially inward than the outer diameter of first through hole 11a. It is acceptable that at least one of first inward protruding member 14a and second inward protruding member 14b may have an inner diameter smaller than that of first through hole 11a. Since inward protruding portion 14 has an inner diameter smaller than the inner diameter of first through hole 11a, it is possible for the inner peripheral surface of inward protruding portion 14 to abut against the outer peripheral surface of exhaust tube 20 which is held in first through hole 11a. Therefore, the peripheral surface of exhaust tube 20 can be further held by the inner peripheral surface of inward protruding portion 14.

Next, a fourth modification of the present invention will be described with reference to FIGS. 13 and 14.

In the above, the description has been carried out in the case where each of outward protruding portion 13 and inward protruding portion 14 is formed to have a tapered shape, outward protruding portion 13 and inward protruding portion 14 may each have a flat plate shape.

Figure 13:
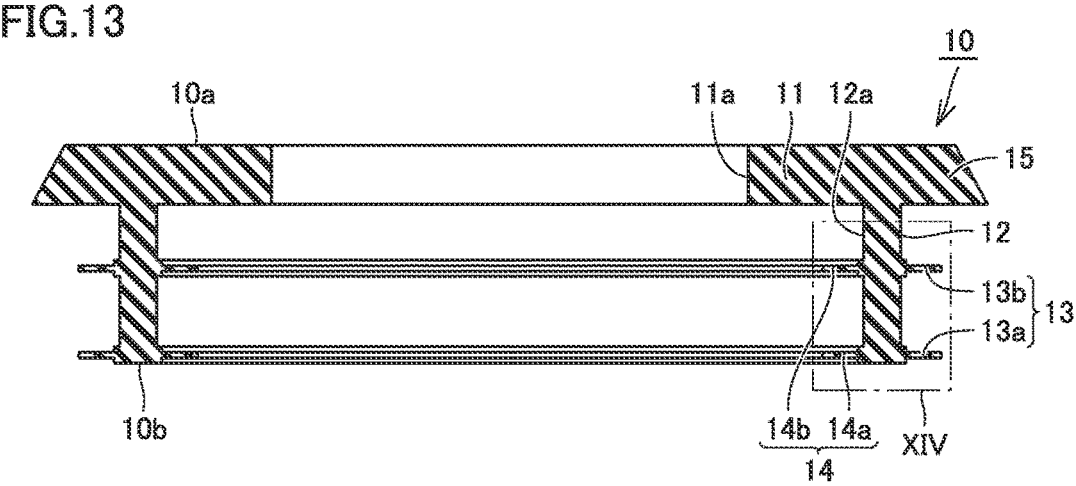
FIG. 13 is a sectional view illustrating the configuration of an exhaust tube holding member according to a fourth modification of an embodiment of the present invention.
Figure 14:
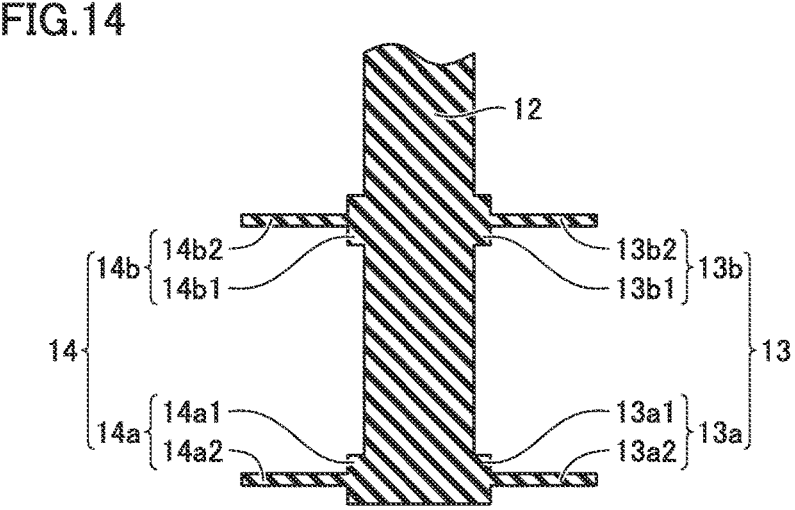
FIG. 14 is an enlarged view corresponding to a region XIV in FIG. 13.

In the fourth modification of the present invention, as illustrated in FIGS. 13 and 14, outward protruding portion 13 and inward protruding portion 14 each have a flat plate shape. First outward protruding member 13a includes a reinforcement portion 13a1 and a main body portion 13a2. Reinforcement portion 13a1 and main body portion 13a2 are each formed to have an annular shape and are glued together. As illustrated in FIG. 14, reinforcement portion 13a1 is wider than main body portion 13a2 in the vertical direction. Main body portion 13a2 is connected to second annular portion 12 through the intermediary of reinforcement portion 13a1.

Second outward protruding member 13b includes a reinforcement portion 13b1 and a main body portion 13b2. Reinforcement portion 13b1 and main body portion 13b2 are each formed to have an annular shape and are glued together. As illustrated in FIG. 14, reinforcement portion 13b1 is wider than main body portion 13b2 in the vertical direction. Main body portion 13b2 is connected to second annular portion 12 through the intermediary of reinforcement portion 13b1. In the fourth modification of the present invention, the strength of first outward protruding member 13a and second outward protruding member 13b is ensured respectively by reinforcement portions 13a1 and 13b1, while the deformation property thereof is ensured respectively by main body portions 13a2 and 13b2.

First inward protruding member 14a includes a reinforcement portion 14a1 and a main body portion 14a2. Reinforcement portion 14a1 and main body portion 14a2 are each formed to have an annular shape and are glued together. As illustrated in FIG. 14, reinforcement portion 14a1 is wider than main body portion 14a2 in the vertical direction. Main body portion 14a2 is connected to second annular portion 12 through the intermediary of reinforcement portion 14a1.

Second inward protruding member 14b includes a reinforcement portion 14b1 and a main body portion 14b2. Reinforcement portion 14b1 and main body portion 14b2 are each formed to have an annular shape and are glued together. As illustrated in FIG. 14, reinforcement portion 14b1 is wider than main body portion 14b2 in the vertical direction. Main body portion 14b2 is connected to second annular portion 12 through the intermediary of reinforcement portion 14b1. In the fourth modification of the present invention, the strength of first inward protruding member 14a and second inward protruding member 14b is ensured respectively by reinforcement portions 14a1 and 14b1, while the deformation property thereof is ensured respectively by main body portions 14a2 and 14b2.

Next, a fifth modification of the present invention will be described with reference to FIGS. 15 and 16.

In the above, the description has been carried out in the case where outward protruding portion 13 is formed to have an annular shape, however, outward protruding portion 13 is not necessarily annular. In the fifth modification of the present invention, as illustrated in FIGS. 15 and 16, outward protruding portion 13 is provided with a plurality of outward protruding pieces. in other words, outward protruding portion 13 includes at least a first outward protruding piece 131 and a second outward protruding piece 132. Specifically, in the fifth modification of the present invention, in addition to first outward protruding piece 131 and second outward protruding piece 132, outward protruding portion 13 further includes a third outward protruding piece 133 and a fourth outward protruding piece 134. First outward protruding piece 131, second outward protruding piece 132, third outward protruding piece 133 and fourth outward protruding piece 134 are equiangularly disposed on the outer peripheral surface of second annular portion 12 about central axis C of second through hole 12a. In other words, first outward protruding piece 131, second outward protruding piece 132, third outward protruding piece 133 and fourth outward protruding piece 134 are disposed on the outer peripheral surface of second annular portion 12 about central axis C of second through hole 12a in such a manner that adjacent outward protruding pieces form an angle of 90°.

Specifically, first outward protruding piece 131 and second outward protruding piece 132 sandwich central axis C of second through hole 12a and face each other in the radial direction of second through hole 12a. Third outward protruding piece 133 and fourth outward protruding piece 134 sandwich central axis C of second through hole 12a and face each other in the radial direction of second through hole 12a. The radial direction along with first outward protruding piece 131 and second outward protruding piece 132 are facing each other is orthogonal to the radial direction with third outward protruding piece 133 and fourth outward protruding piece 134 are facing each other. However, the present invention is not limited thereto, the plurality of outward protruding pieces may be disposed at 3 locations on the outer peripheral surface of second annular portion 12 about central axis C of second through hole 12a in such a manner that adjacent outward protruding pieces form an angle of 120°. Furthermore, the plurality of outward protruding pieces may be disposed at 5 locations or more.

The outer end of first outward protruding piece 131, the outer end of second outward protruding piece 132, the outer end of third outward protruding piece 133 and the outer end of fourth outward protruding piece 134 are configured to have equal distance to central axis C in the direction orthogonal to central axis C of second through hole 12a.

Next, a sixth modification of the present invention will be described with reference to FIGS. 17 and 18.

In the above, the description has been carried out in the case where inward protruding portion 14 is formed to have an annular shape, however, inward protruding portion 14 is not necessarily annular. In the sixth modification of the present invention, as illustrated in FIGS. 17 and 18, inward protruding portion 14 is provided with a plurality of inward protruding pieces. in other words, inward protruding portion 14 includes at least a first inward protruding piece 141 and a second inward protruding piece 142. Specifically, in the sixth modification of the present invention, in addition to first inward protruding piece 141 and second inward protruding piece 142, inward protruding portion 14 further includes a third inward protruding piece 143 and a fourth inward protruding piece 144. First inward protruding piece 141, second inward protruding piece 142, third inward protruding piece 143 and fourth inward protruding piece 144 are equiangularly disposed on the outer peripheral surface of second annular portion 12 about central axis C of second through hole 12a. In other words, first inward protruding piece 141, second inward protruding piece 142, third inward protruding piece 143 and fourth inward protruding piece 144 are disposed on the outer peripheral surface of second annular portion 12 about central axis C of second through hole 12a in such a manner that adjacent inward protruding pieces form an angle of 90°.

Specifically, first inward protruding piece 141 and second inward protruding piece 142 sandwich central axis C of second through hole 12a and face each other in the radial direction of second through hole 12a. Third inward protruding piece 143 and fourth inward protruding piece 144 sandwich central axis C of second through hole 12a and face each other in the radial direction of second through hole 12a. The radial direction along with first inward protruding piece 141 and second inward protruding piece 142 are facing each other is orthogonal to the radial direction with third inward protruding piece 143 and fourth inward protruding piece 144 are facing each other. However, the present invention is not limited thereto, the plurality of inward protruding pieces may be disposed at 3 locations on the outer peripheral surface of second annular portion 12 about central axis C of second through hole 12a in such a manner that adjacent outward protruding pieces form an angle of 120°. Furthermore, the plurality of inward protruding pieces may be disposed at 5 locations or more.

The inner end of first inward protruding piece 141, the inner end of second inward protruding piece 142, the inner end of third inward protruding piece 143 and the inner end of fourth inward protruding piece 144 are configured to have equal distance to central axis C in the direction orthogonal to central axis C of second through hole 12a.

Next, a seventh modification of the present invention will be described with reference to FIGS. 19 and 20.

Figure 19:
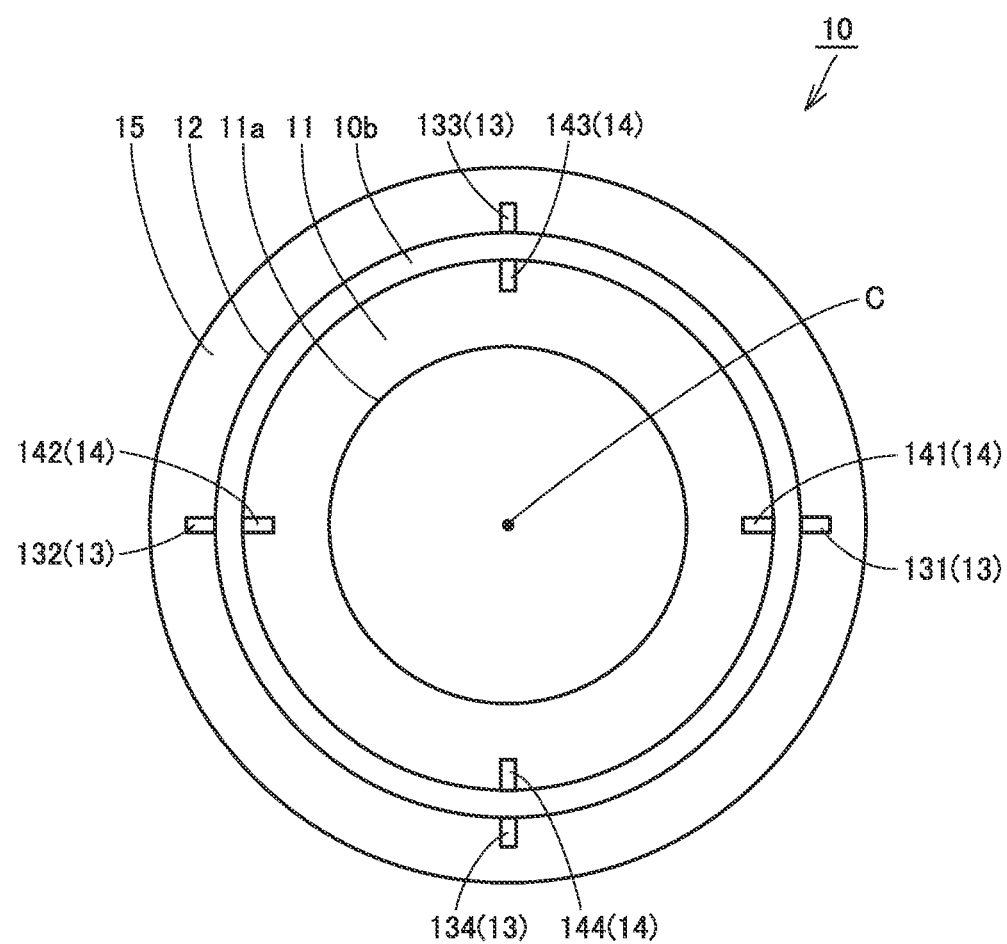
FIG. 19 is a planar view illustrating the configuration of an exhaust tube holding member according to a seventh modification of an embodiment of the present invention when viewed from the side of the lower surface of the exhaust tube holding member.
Figure 20:
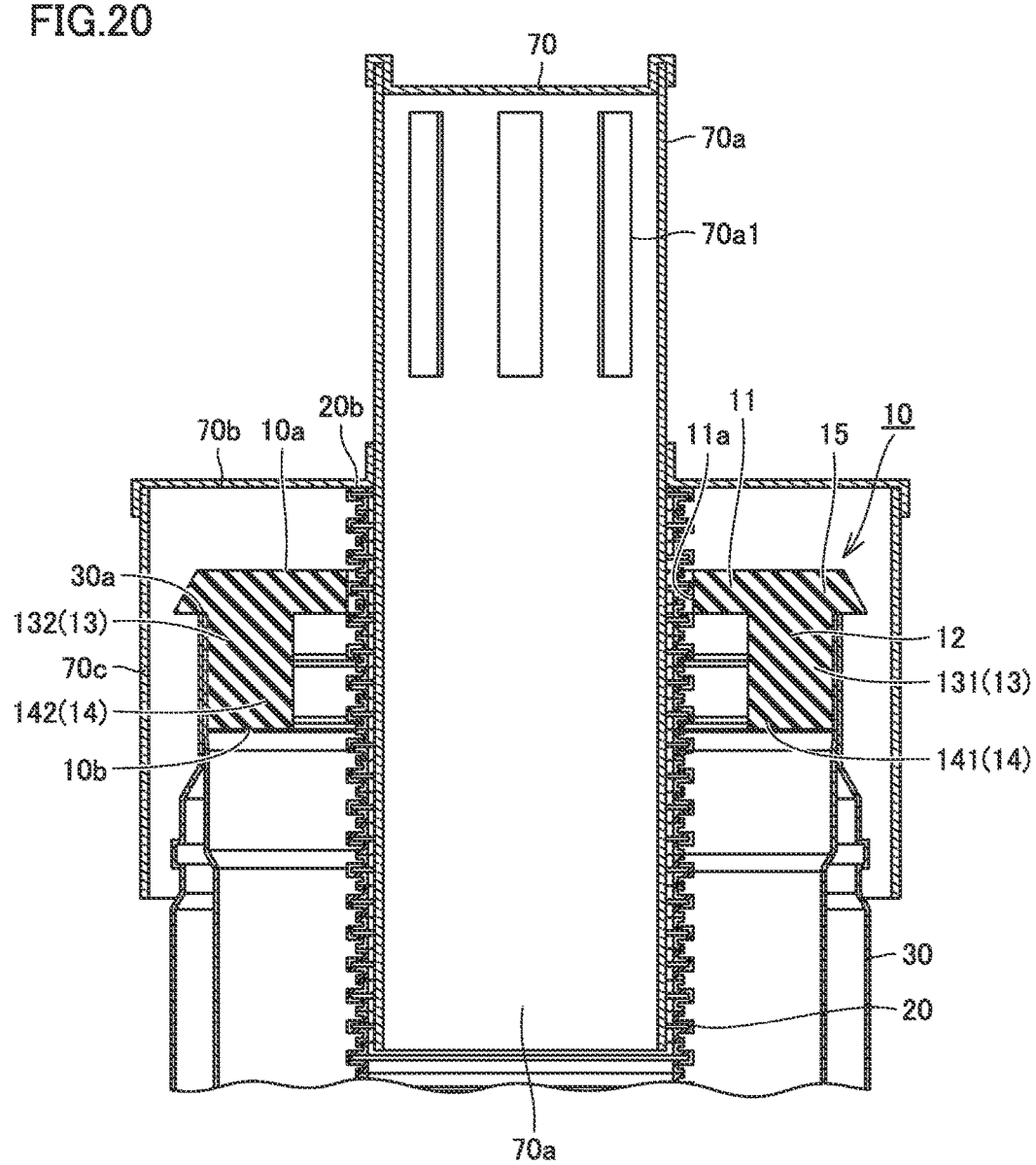
FIG. 20 is a cross-sectional view illustrating how an exhaust tube holding member included in the exhaust structure for combustion apparatus according to the seventh modification of an embodiment of the present invention is used to hold an exhaust tube inside an exhaust pipe of a relatively large diameter as illustrated in FIG. 2.

In the seventh modification of the present invention, as illustrated in FIGS. 19 and 20, outward protruding portion 13 includes a first outward protruding piece 131, a second outward protruding piece 132, a third outward protruding piece 133 and a fourth outward protruding piece 134 which are the same as those illustrated in the fifth modification, and inward protruding portion 14 includes a first inward protruding piece 141, a second inward protruding piece 142, a third inward protruding piece 143 and a fourth inward protruding piece 144 which are the same as those illustrated in the sixth modification.

First outward protruding piece 131 and first inward protruding piece 141 sandwich second annular portion 12 and face each other in the radial direction of second through hole 12a. Similarly, second outward protruding piece 132 and second inward protruding piece 142 sandwich second annular portion 12 and face each other in the radial direction of second through hole 12a, third outward protruding piece 133 and third inward protruding piece 143 sandwich second annular portion 12 and face each other in the radial direction of second through hole 12a, and fourth outward protruding piece 134 and fourth inward protruding piece 144 sandwich second annular portion 12 and face each other in the radial direction of second through hole 12a.

Hereinafter, the method of installing the exhaust structure for combustion apparatus 100 of the present embodiment will be described. Firstly, the installation method in the case where exhaust pipe 30 has a relatively large diameter (for example, 4 inches) will be described with reference to FIGS. 1 and 2.

As illustrated in FIG. 1, one end 20a of exhaust tube 20 is connected to combustion apparatus 80, and the other end 20b of exhaust tube 20 is inserted through exhaust pipe 30 from the lower end of exhaust pipe 30. As illustrated in FIG. 2, the other end 20b of exhaust tube 20 is pulled out from upper end 30a of exhaust pipe 30. After the other end 20b of exhaust tube 20 is pulled out from upper end 30a of exhaust pipe 30, exhaust tube holding member 10 is attached to the outer peripheral surface of exhaust tube 20. Specifically, the attachment of exhaust tube holding member 10 around exhaust tube 20 is performed in such a manner that exhaust tube 20 is inserted from the other end 20b into first through hole 11a of first annular portion 11, and then, the inner peripheral surface of the holding member 10 is attached to the outer peripheral surface of exhaust tube 20.

After exhaust tube holding member 10 is attached to the outer peripheral surface of exhaust tube 20, second annular portion 12 is inserted into exhaust pipe 30. Thus, outward protruding portion 13 formed on second annular portion 12 abuts against the inner peripheral surface of exhaust pipe 30. Further, flange portion 15 of exhaust tube holding member 10 abuts against upper end 30a of exhaust pipe 30, and thereby, flange portion 15 is held at upper end 30a of exhaust pipe 30. Thereafter, rain cap 70 is attached to exhaust tube 20. Specifically, discharge member 70a of rain cap 70 is inserted into exhaust tube 20 from the other end 20b of exhaust tube 20. Thereby, exhaust structure for combustion apparatus 100 in the present embodiment is installed in building 200.

Next, the installation method in the case where exhaust pipe 30 has a relatively small diameter (for example, 3 inches) will be described with reference to FIG. 7. In this case, after exhaust tube holding member 10 is attached to the outer peripheral surface of exhaust tube 20, exhaust pipe 30 is inserted into second annular portion 12. Thus, inward protruding portion 14 formed on second annular portion 12 abuts against the outer peripheral surface of exhaust pipe 30. Since the other installation steps are the same as those in the above case where exhaust pipe 30 has a relatively large diameter (for example, 4 inches), the description thereof will not be repeated.

Hereinafter, the configuration of combustion apparatus 80 used in exhaust structure for combustion apparatus 100 mentioned above will be described with reference to FIGS. 21 and 22.

As described in the above, combustion apparatus 80 used in the above exhaust structure for combustion apparatus 100 may be a water heater of a latent heat recovery type adapted to an exhaust suction and combustion system.

Figure 21:
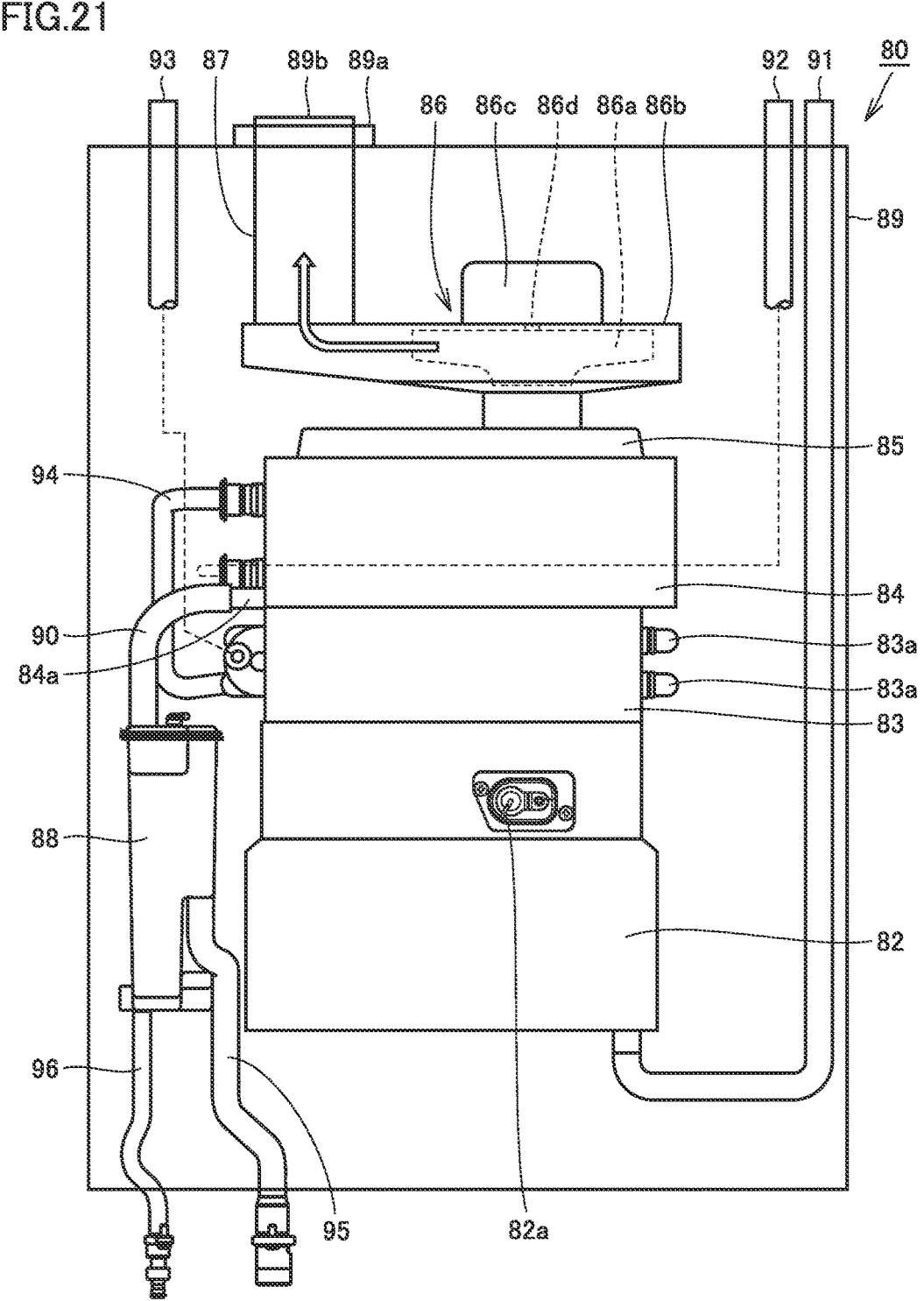
FIG. 21 is a front view schematically illustrating the configuration of a water heater which serves as an example of the exhaust structure for combustion apparatus according to an embodiment of the present invention.
Figure 22:
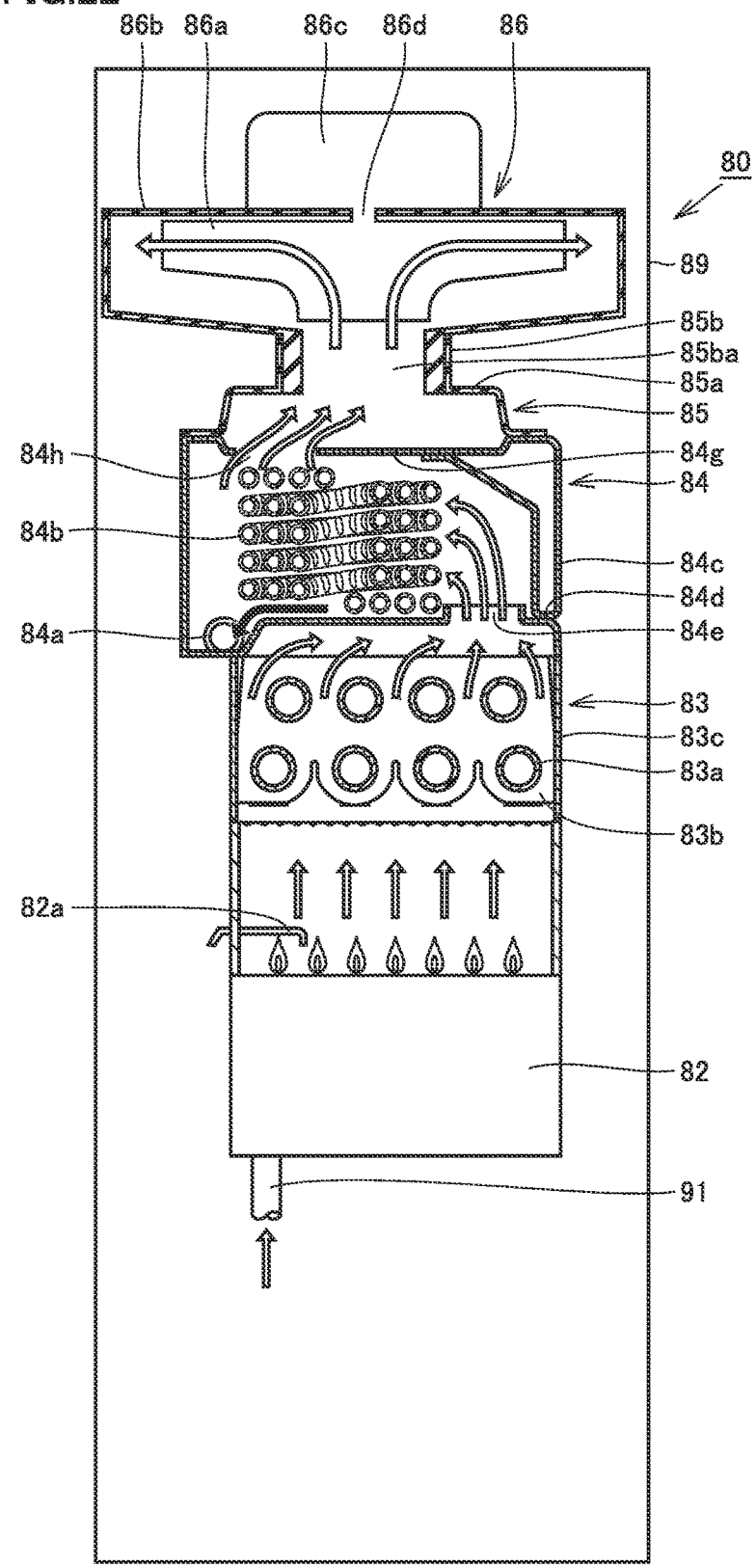
FIG. 22 is a partial cross-sectional side view schematically illustrating the configuration of the water heater illustrated in FIG. 15.

As illustrated in FIGS. 21 and 22, combustion apparatus 80 generally includes a burner 82, a primary heat exchanger 83, a secondary heat exchanger 84, an exhaust box 85, a fan 86, a connection pipe 87, a drainage water tank 88, a housing 89, and pipes 90 to 96.

Burner 82 is configured to produce combustion gas by combusting fuel gas. Burner 82 is connected to a gas supply pipe 91. Gas supply pipe 91 is configured to supply the fuel gas to burner 82. Gas supply pipe 91 is provided with a gas valve composed of an electromagnetic valve (not shown), for example.

A spark plug 82a is disposed above burner 82. This spark plug 82a is configured to produce ignition sparks between the spark plug and an ignition target (not shown) provided in burner 82 in response to the actuation of an ignition device (igniter) so as to produce a flame in a fuel air mixture erupted from burner 82. Burner 82 generates heat by combusting the fuel gas supplied from gas supply pipe 91 (hereinafter, it will be called as the combustion operation).

Primary heat exchanger 83 is a sensible heat recovery type heat exchanger. Primary heat exchanger 83 generally includes a plurality of plate-shaped fins 83b, a heat transfer tube 83a that penetrates the plurality of plate-shaped fins 83b, and a case 83c for housing therein the plurality of plate-shaped fins 83b and heat transfer tube 83a. Primary heat exchanger 83 is configured to perform heat exchange with the combustion gas generated by burner 82, specifically it is configured to heat water flowing in heat transfer tube 83a of primary heat exchanger 83 by using the heat generated through the combustion operation of burner 82.

Secondary heat exchanger 84 is a latent heat recovery type heat exchanger. Secondary heat exchanger 84 is located downstream of the flow of the combustion gas than primary heat exchanger 83, and is connected in series to primary heat exchanger 83. Thus, combustion apparatus 80 according to the present embodiment includes secondary heat exchanger 84 of latent heat recovery type, and thereby is a water heater of a latent heat recovery type.

Secondary heat exchanger 84 generally includes a drainage water discharge port 84a, a heat transfer tube 84b, a side wall 84c, a bottom wall 84d, and an upper wall 84g. Heat transfer tube 84b is spirally wound and laminated. Side wall 84c, bottom wall 84d and upper wall 84g are arranged to surround the periphery of heat transfer tube 84b.

In secondary heat exchanger 84, the hot water flowing in heat transfer tube 84b is pre-heated (heated) by the heat exchanged from the combustion gas after it is subjected to heat exchange in primary heat exchanger 83. During the process, as temperature of the combustion gas drops to about 60° C., the water vapor contained in the combustion gas is condensed, which makes it possible to recover the latent heat. After the latent heat is recovered in secondary heat exchanger 84, the water vapor contained in the combustion gas is condensed into drainage water.

Bottom wall 84d serves as a partition between primary heat exchanger 83 and secondary heat exchanger 84, and it also serves as an upper wall of primary heat exchanger 83. An opening 84e is provided on bottom wall 84d. Through the intermediary of opening 84e, the space where heat transfer tube 83a of primary heat exchanger 83 is arranged is brought into communication with the space where heat transfer tubes 84b of secondary heat exchanger 84 is arranged. As indicated by the hollow arrows in FIG. 22, the combustion gas can flow from primary heat exchanger 83 into secondary heat exchanger 84 through opening 84e. In the present embodiment, for the sake of simplification, bottom wall 84d of secondary heat exchanger 84 and the upper wall of primary heat exchanger 83 share a common wall, it is acceptable to have an exhaust collection and guide member connected between primary heat exchanger 83 and secondary heat exchanger 84.

Upper wall 84g is provided with an opening 84h. Through the intermediary of opening 84g, the space where heat transfer tube 84b of secondary heat exchanger 84 is arranged is brought into communication with the internal space of exhaust box 85. As indicated by the hollow arrows in FIG. 22, the combustion gas can flow from secondary heat exchanger 84 into the internal space of exhaust box 85 through opening 84h.

Drainage water discharge port 84a is provided on side wall 84c or bottom wall 84d. This drainage water discharge port 84a is opened at the lowest position (the lowermost position in the vertical direction after the water heater has been installed) in the space surrounded by side wall 84c, bottom wall 84d and upper wall 84g, which is lower than the lower end of heat transfer tube 84b. Accordingly, the drainage water which is produced in secondary heat exchanger 84 can be guided to drainage water discharge port 84a along bottom wall 84d and side wall 84c as indicated by a black arrow in FIG. 22.

Exhaust box 85 constitutes a flow path for the combustion gas between secondary heat exchanger 84 and fan 86.

Through the intermediary of exhaust box 85, the combustion gas after the heat exchange with secondary heat exchanger 84 can be guided to fan 86. Exhaust box 85 is mounted on secondary heat exchanger 84, and is positioned downstream of the flow of the combustion gas than secondary heat exchanger 84.

Exhaust box 85 generally includes a box body 85*a* and a fan connection member 85*b*. The internal space of box body 85*a* is in communication with the internal space where heat transfer tubes 84*b* of secondary heat exchanger 84 is disposed through opening 84*h* of secondary heat exchanger 84. Fan connection member 85*b* is provided so as to protrude from the top of box body 85*a*. This fan connection member 85*b* has for example a cylindrical shape, and an internal space 85*ba* thereof is in communication with the internal space of box body 85*a*.

Fan 86 is configured to suck the combustion gas passed through secondary heat exchanger 84 (subjected to heat exchange with secondary heat exchanger 84) so as to discharge it the outside of combustion apparatus 80. Fan 86 is positioned downstream of the flow of the combustion gas than exhaust box 85 and secondary heat exchanger 84. In other words, in combustion apparatus 80, burner 82, primary heat exchanger 83, secondary heat exchanger 84, exhaust box 85 and fan 86 are arranged in the mentioned order from the upstream to the downstream of the flow of the combustion gas generated by burner 82. As mentioned in the above, since the combustion gas is discharged by fan 86 through suction, combustion apparatus 80 of the present embodiment is a water heater adapted to an exhaust suction and combustion system.

Fan 86 generally includes an impeller 86*a*, a fan case 86*b*, a drive source 86*c*, and a rotation shaft 86*d*. Fan case 86*b* is attached to fan connection member 85*b* of exhaust box 85 so as to communicate the internal space of fan case 86*b* with the internal space of fan connection member 85*b*. As indicated by the hollow arrows in FIG. 22, the combustion gas can be sucked from box body 85*a* of exhaust box 85 into fan case 86*b* through fan connection member 85*b*.

Impeller 86*a* is disposed inside fan case 86*b*. Impeller 86*a* is connected to drive source 86*c* through the intermediary of rotation shaft 86*d*. Thereby, impeller 86*a* is supplied with a driving force from drive source 86*c*, rotatable about rotation shaft 86*d*. Due to the rotation of impeller 86*a*, the combustion gas in exhaust box 85 can be sucked into the inner peripheral space of impeller 86*a* and expelled to the outer peripheral space of impeller 86*a*.

Connection pipe 87 is connected to a region outside the outer peripheral space where impeller 86*a* is disposed among the internal space of fan case 86*b*. Therefore, the combustion gas expelled to the outer peripheral space of impeller 86*a* by impeller 86*a* of fan 86 can be emitted into exhaust tube 20 through connection pipe 87.

As mentioned in the above, the combustion gas produced by burner 82 is sucked into fan 86 due to the rotation of impeller 86*a*, after sequentially passing through primary heat exchanger 83, secondary heat exchanger 84 and exhaust box 85, the combustion gas reaches fan 86 as indicated by the hollow arrows in FIG. 22, it can be discharged to the outside of combustion apparatus 80.

Drainage water tank 88 is configured to accumulate the drainage water generated in secondary heat exchanger 84. Drainage water tank 88 is connected to secondary heat exchanger 84 through pipe 90. Pipe 90 is connected to drainage water discharge port 84*a* of secondary heat exchanger 84, which makes it possible to drain the drainage water generated in secondary heat exchanger 84 into drainage water tank 88. This drainage water tank 88 is further connected with a pipe 95 extending to the outside of combustion apparatus 80. Thus, the drainage water accumulated in drainage water tank 88 can be drained to the outside of combustion apparatus 80 through pipe 95.

Drainage water tank 88 is provided with a water-seal structure. Specifically, drainage water tank 88 has such a structure that after the drainage water is accumulated in drainage water tank 88 to a predetermined amount, the accumulated drainage water prevents air from passing through drainage water tank 88. With the help of the water-seal structure of drainage water tank 88, the air outside combustion apparatus 80 (outside air) can be prevented from passing through drainage water tank 88 via pipe 95 to enter into combustion apparatus 80 (such as secondary heat exchanger 84).

In addition, a lower portion of drainage water tank 88 is connected to a drainage water drain pipe 96, separately from drainage water discharge pipe 95. Drainage water drain pipe 96 (which is normally closed) is configured to be opened for example during maintenance so as to discharge the drainage water which is accumulated in drainage water tank 88. Optionally, the internal space of drainage water tank 88 may be filled with a neutralizing agent (not shown) so as to neutralize the acidic drainage water.

A water supply pipe 92 is connected to one end of heat transfer tube 84*b* of secondary heat exchanger 84, and a hot water delivery pipe 93 is connected to one end of heat transfer tube 83*a* of primary heat exchanger 83. Further, the other end of heat transfer tube 83*a* of primary heat exchanger 83 and the other end of heat transfer tube 84*b* of secondary heat exchanger 84 are connected to each other by a pipe 94. Each of gas supply pipe 91, water supply pipe 92 and hot water delivery pipe 93 mentioned above leads to the outside at a top portion of combustion apparatus 80, for example. In addition, burner 82, primary heat exchanger 83, secondary heat exchanger 84, exhaust box 85, fan 86, drainage water tank 88 and the like are disposed inside housing 89.

Housing 89 includes a connection member 89*a* and an exhaust member 89*b*. Specifically, connection member 89*a* which protrudes upward in tubular shape and exhaust member 89*b* which protrudes upward in tubular shape are provided concentrically on the upper surface of housing 89. In other words, connection member 89*a* and exhaust member 89*b* constitute a double pipe structure.

Connection member 89*a* is disposed to surround the outer peripheral surface of exhaust member 89*b*, and is provided with a connection hole in a region inside housing 89 between the outer surface of exhaust member 89*b* and the inner peripheral surface of connection member 89*a*. Further, an exhaust vent is provided in housing 89 inner to exhaust member 89*b*. The connection hole is in communication with the interior of housing 89, and the exhaust vent is in communication with the interior of connection pipe 87. Thereby, the vacancy between the outer peripheral surface of exhaust tube 20 and the inner peripheral surface of connection pipe 60 is brought into communication with the internal space of housing 89 via the connection hole provided in housing 89. Further, the combustion gas after passing through burner 82 is fed from connection pipe 87 into exhaust tube 20 through exhaust member 89*b*.

Connection member 89*a* is connected to connection pipe 60 at one end side of connection pipe 60, and exhaust member 89*b* is connected to exhaust tube 20 at one end 20*a* of exhaust tube 20. Note that exhaust member 89*b* may be also connected to connection pipe 87 which is housed inside housing 89. For example, in the case where exhaust member 89b is configured to protrude from the upper surface of housing 89 downward in tubular shape, the connection between exhaust member 89b and connection pipe 87 will become easier.

Connection member 89a and connection pipe 60 may be connected in such a manner that no gas flowing inside will leak out. Similarly, exhaust member 89b and exhaust tube 20 (and connection pipe 87) may be connected in such a manner that no gas flowing inside will leak out. Thus, an O-ring may be interposed between the two connected parts or a binding band may be used to firmly bind the two connected parts. The two parts may be outer attached or inner attached to each other.

The effects of the embodiments of the present invention will be described hereinafter.

As illustrated in FIGS. 2 and 3, according to exhaust tube holding member 10 of the present invention, outward protruding portion 13 protrudes peripherally outward from the outer peripheral surface of second annular portion 12, and inward protruding portion 14 protrudes peripherally inward from the inner peripheral surface of second annular portion 12. Therefore, it is possible to support exhaust pipe 30 as outward protruding portion 13 abuts against the inner peripheral surface of exhaust pipe 30, and it is also possible to support exhaust pipe 30 as inward protruding portion 14 abuts against the outer peripheral surface of exhaust pipe 30. Thus, it is possible to use a single exhaust tube holding member 10 to deal with various exhaust pipe 30 of different sizes.

Since outward protruding portion 13 is annular, as outward protruding portion 13 abuts against the inner peripheral surface of exhaust pipe 30, a gap between outward protruding portion 13 and the inner peripheral surface of exhaust pipe 30 can be sealed.

As illustrated in FIGS. 2 and 3, in the exhaust tube holding member of the present embodiment, outward protruding portion 13 includes first outward protruding member 13a having an annular shape and second outward protruding member 13b having an annular shape. Thus, exhaust pipe 30 can be supported by both first outward protruding member 13a and second outward protruding member 13b. Thereby, exhaust pipe 30 can be supported more reliably. Further, since both first outward protruding member 13a and second outward protruding member 13b can seal the gap between outward protruding portion 13 and the inner peripheral surface of exhaust pipe 30, the gap between outward protruding portion 13 and the inner peripheral surface of exhaust pipe 30 can be sealed more reliably.

As illustrated in FIG. 8, in exhaust tube holding member 10 according to the first modification of the present invention, first outward protruding member 13a has an outer diameter larger than the outer diameter of second outward protruding member 13b, and second outward protruding member 13b is disposed closer to first annular portion 11 than first outward protruding member 13a. Thus, although first outward protruding member 13a deforms greater than second outward protruding member 13b relative to first annular portion 11, it is still possible for first outward protruding member 13a to abut against the inner peripheral surface of exhaust pipe 30. Thereby, it is possible to reliably seal the gap between first outward protruding member 13a and the inner peripheral surface of exhaust pipe 30.

As illustrated in FIGS. 9 and 10, in exhaust tube holding member 10 according to the second modification of the present invention, in a cross section perpendicular to the radial direction of outward protruding portion 13, the outer peripheral end of first outward protruding member 13a has a radius of curvature greater than the radius of curvature of the outer peripheral edge of second outward protruding member 13b, and second outward protruding member 13b is disposed closer to first annular portion 11 than first outward protruding member 13a. Therefore, in a state of abutting against the inner peripheral surface of exhaust pipe 30, it is easier for the outer peripheral edge of first outward protruding member 13a to slide on the inner peripheral surface of exhaust pipe 30 than the outer peripheral edge of second outward protruding member 13b. Thereby, it is possible to easily insert the outer peripheral end of first outward protruding member 13a into exhaust pipe 30. Accordingly, it is possible to facilitate the insertion of both first outward protruding member 13a and second outward protruding member 13b into exhaust pipe 30.

As illustrated in FIGS. 2 and 3, since the inward protruding portion 14 is annular, as inward protruding portion abuts against the outer peripheral surface of exhaust pipe 30, a gap between inward protruding portion 14 and the outer peripheral surface of exhaust pipe 30 can be sealed.

In the exhaust tube holding member according to the present embodiment, inward protruding portion 14 includes first inward protruding member 14a having an annular shape and second inward protruding member 14b having an annular shape. Thus, exhaust pipe 30 can be supported by both first inward protruding member 14a and second inward protruding member 14b. Thereby, exhaust pipe 30 can be supported more reliably. Further, since both first inward protruding member 14a and second inward protruding member 14b can seal the gap between inward protruding portion 14 and the outer peripheral surface of exhaust pipe 30. Therefore, the gap between inward protruding portion 14 and the outer peripheral surface of exhaust pipe 30 can be sealed more reliably.

As illustrated in FIG. 8, in exhaust tube holding member 10 according to the first modification of the present invention, first inward protruding member 14a has an inner diameter smaller than the inner diameter of second inward protruding member 14b, and second inward protruding member 14b is disposed closer to first annular portion 11 than first inward protruding member 14a. Thus, although first inward protruding member 14a deforms greater than second inward protruding member 14b relative to first annular portion 11, it is still possible for first inward protruding member 14a to abut against the outer peripheral surface of exhaust pipe 30. Thereby, it is possible to reliably seal the gap between first outward protruding member 13a and the inner peripheral surface of exhaust pipe 30.

As illustrated in FIGS. 9 and 10, in exhaust tube holding member 10 according to the second modification of the present invention, in a cross section perpendicular to the radial direction of inward protruding portion 14, the inner peripheral end of first inward protruding member 14a has a radius of curvature greater than the radius of curvature of the inner peripheral edge of second inward protruding member 14b, and second inward protruding member 14b is disposed closer to first annular portion 11 than first inward protruding member 14a. Therefore, in a state of abutting against the outer peripheral surface of exhaust pipe 30, it is easier for the inner peripheral edge of first inward protruding member 14a to slide on the outer peripheral surface of exhaust pipe 30 than the inner peripheral edge of second inward protruding member 14b. Thereby, it is possible to easily pass exhaust pipe 30 through the inner peripheral end of first inward protruding member 14a. Accordingly, it is possible to facilitate the insertion of exhaust pipe 30 into both first inward protruding member 14a and second inward protruding member 14b.

As illustrated in FIGS. 11 and 12, in exhaust tube holding member 10 according to the third modification of the present invention, inward protruding portion 14 has an inner diameter smaller than the inner diameter of first through hole 11a formed in first annular portion 11. Therefore, it is possible to make the inner peripheral surface of inward protruding portion 14 abut against the outer peripheral surface of exhaust tube 20 which is held inside first through hole 11a. Thereby, it is possible for inward protruding portion 14 to hold the peripheral surface of exhaust tube 20.

As illustrated in FIGS. 1 and 2, exhaust tube holding member 10 according to the present embodiment further includes flange portion 15 configured to extend peripherally outward from the outer peripheral surface of at least one of first annular portion 11 and second annular portion 12 and to abut against upper end 30a of exhaust pipe 30 located outside the building. Thus, it is possible for flange portion 15 to prevent outside air from intruding into a gap between exhaust tube 20 and upper end 30a of exhaust pipe 30 located outside the building. Thereby, the outside air can be prevented from intruding into exhaust pipe 30.

Figure 15:
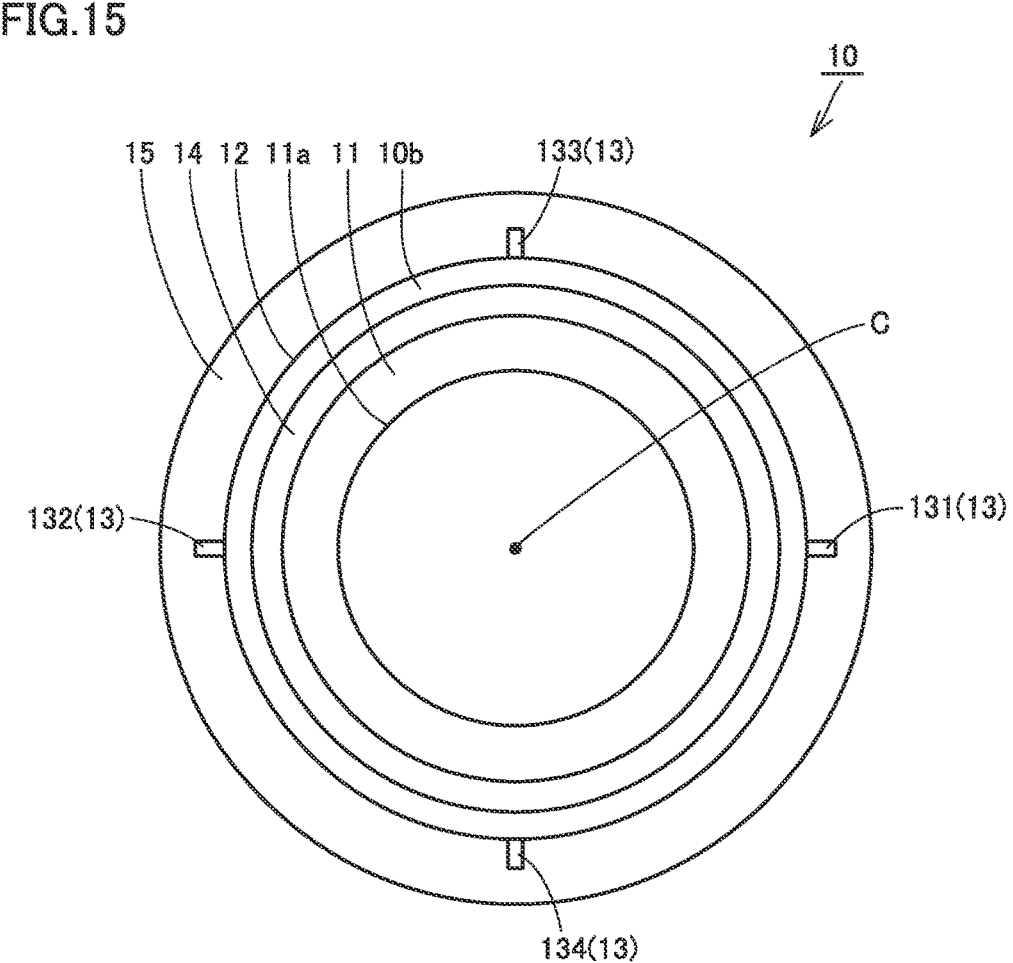
FIG. 15 is a planar view illustrating the configuration of an exhaust tube holding member according to a fifth modification of an embodiment of the present invention when viewed from the side of the lower surface of the exhaust tube holding member.
Figure 16:
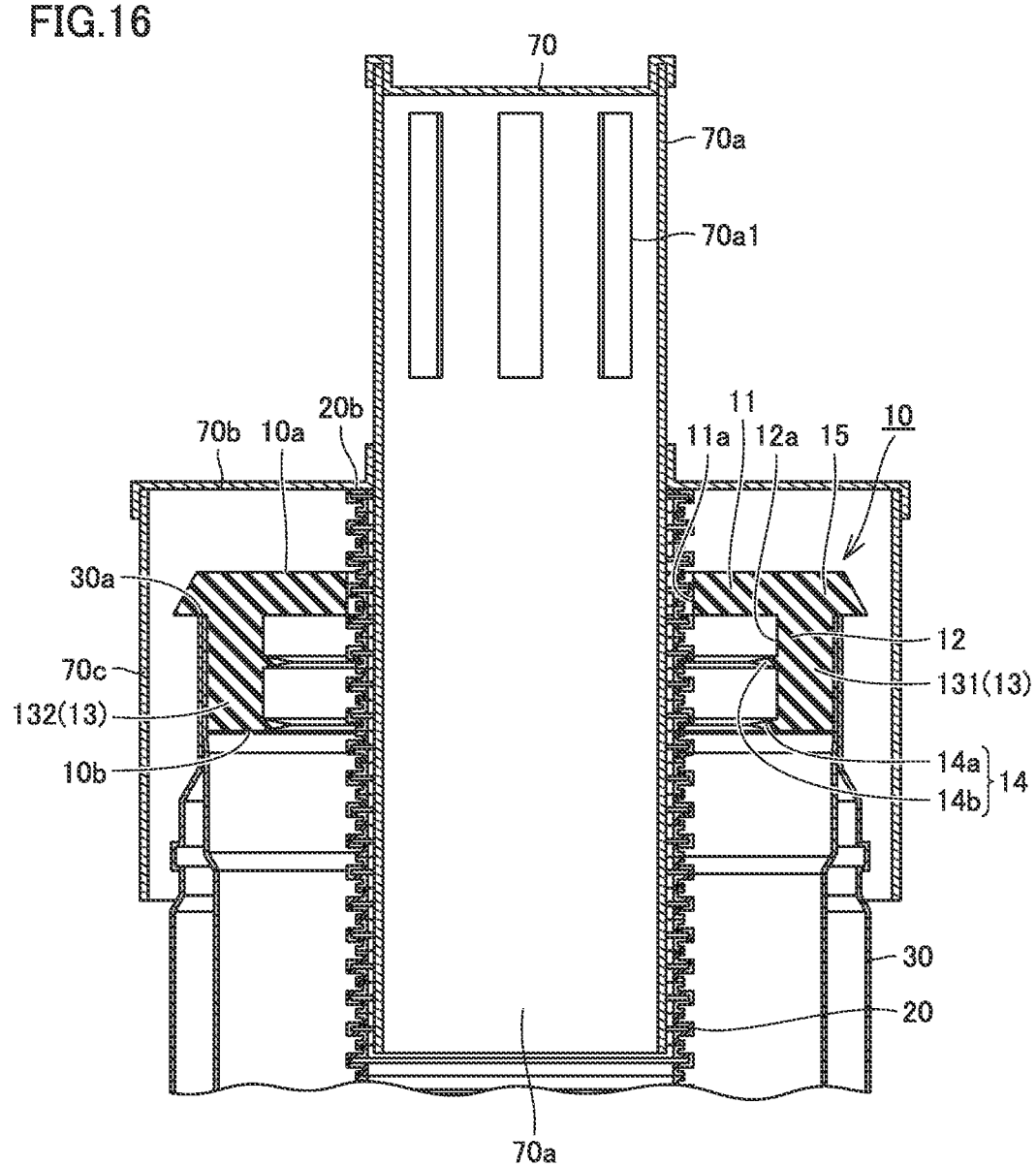
FIG. 16 is a cross-sectional view illustrating how an exhaust tube holding member included in the exhaust structure for combustion apparatus according to the fifth modification of an embodiment of the present invention is used to hold an exhaust tube inside an exhaust pipe of a relatively large diameter as illustrated in FIG. 2.

As illustrated in FIGS. 15 and 16, in exhaust tube holding member 10 according to the present embodiment, outward protruding portion 13 includes at least a first outward protruding piece 131 and a second outward protruding piece 132. Thereby, outward protruding portion 13 can be supported by exhaust pipe 30 through first outward protruding piece 131 and second outward protruding piece 132 at plural locations.

Figure 17:
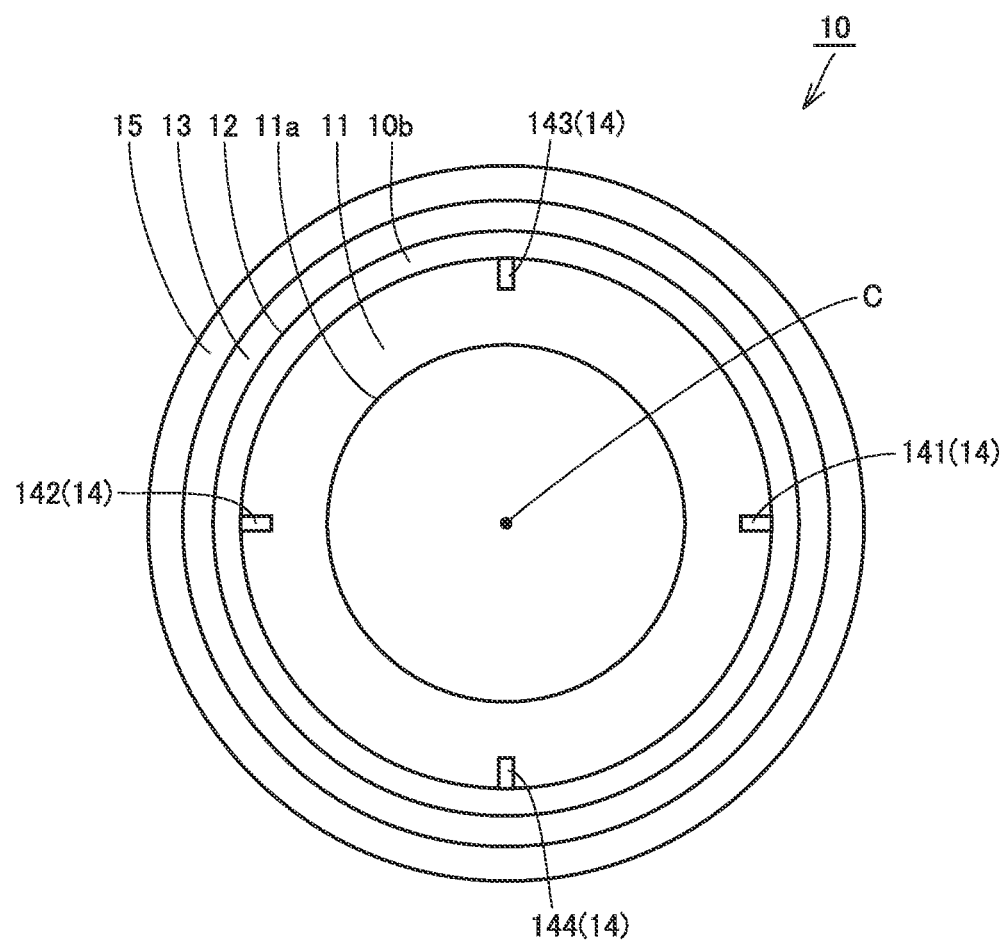
FIG. 17 is a planar view illustrating the configuration of an exhaust tube holding member according to a sixth modification of an embodiment of the present invention when viewed from the side of the lower surface of the exhaust tube holding member.
Figure 18:
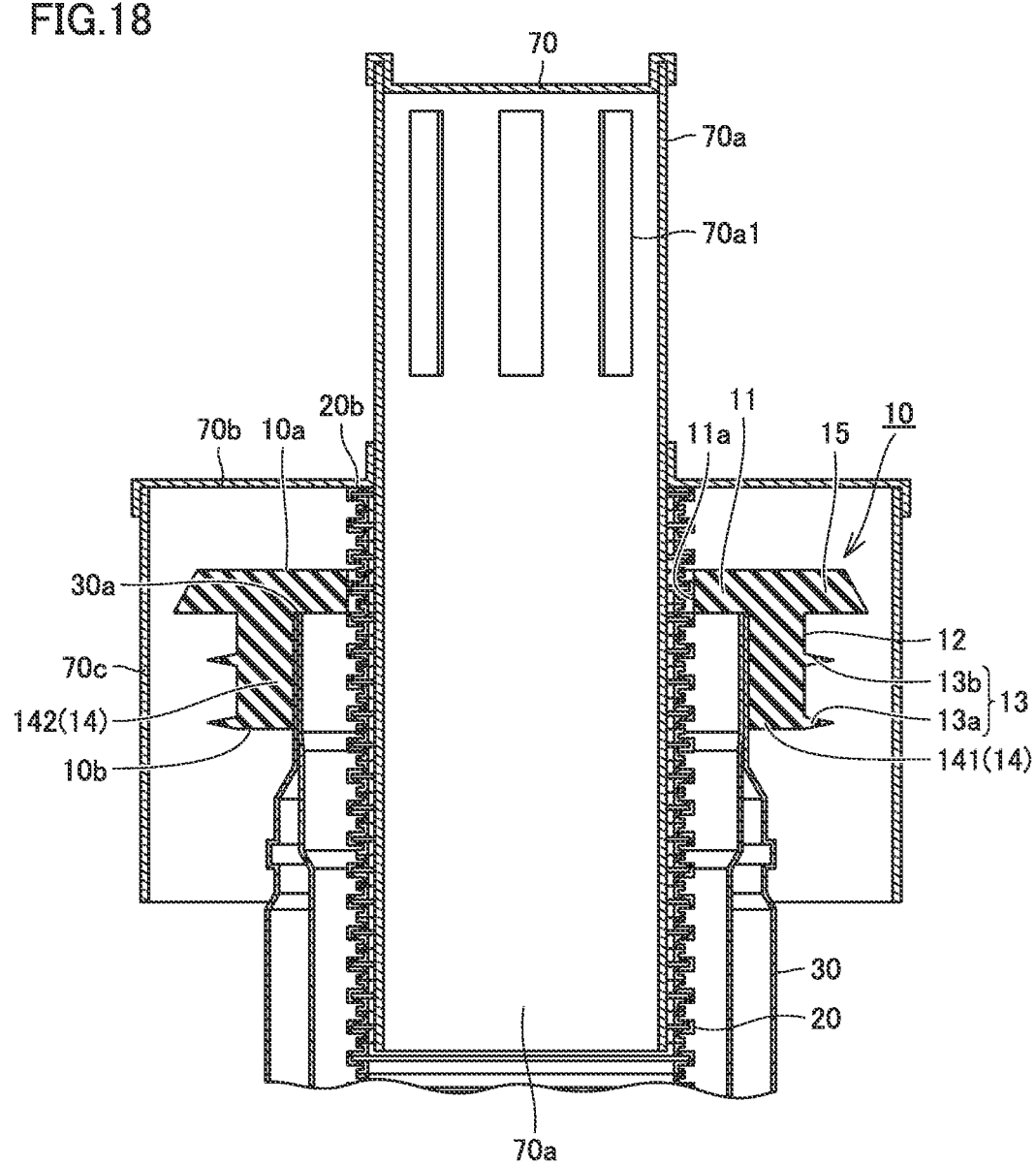
FIG. 18 is a cross-sectional view illustrating how an exhaust tube holding member included in the exhaust structure for combustion apparatus according to the sixth modification of an embodiment of the present invention is used to hold an exhaust tube inside an exhaust pipe of a relatively small diameter as illustrated in FIG. 6.

As illustrated in FIGS. 17 and 18, in exhaust tube holding member 10 according to the present embodiment, inward protruding portion 14 includes at least a first inward protruding piece 141 and a second inward protruding piece 142. Thereby, inward protruding portion 14 can be supported by exhaust pipe 30 through first inward protruding piece 141 and second inward protruding piece 142 at plural locations.

The exhaust structure for combustion device of the present invention includes an exhaust tube holding member, an exhaust pipe, an exhaust pipe, and a rain cap. The exhaust tube holding member is any exhaust tube holding member mentioned in the above. The exhaust tube has one end and the other end, and is connected to the combustion apparatus at one end. The exhaust tube is introduced inside the exhaust pipe. The rain cap is connected to the other end of the exhaust tube and is configured to cover the top of the exhaust tube holding member. The first annular portion of the exhaust tube holding member is attached to the outer peripheral surface of the exhaust tube, and the flange portion is held at the upper end of the exhaust pipe. The outer peripheral end of the outward protruding portion abuts against the inner peripheral surface of the exhaust pipe, or the inner peripheral end of the inward protruding portion abuts against the outer peripheral surface of the exhaust pipe.

As illustrated in FIGS. 1 and 2, according to combustion device exhaust structure 100 of the present embodiment, since the outer peripheral end of outward protruding portion 13 of exhaust tube holding member 10 abuts against the inner peripheral surface of exhaust pipe 30, or the inner peripheral end of inward protruding portion 14 abuts against the outer peripheral surface of exhaust pipe 30, it is possible to use a single exhaust tube holding member to deal with various exhaust pipes of different sizes. Further, since the top of the exhaust tube holding member is covered by the rain cap, the moisture such as rain water can be prevented from entering into the exhaust pipe from an inter-surface gap between the inner peripheral surface of the first through hole formed in the exhaust tube holding member and the outer peripheral surface of the exhaust tube.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An exhaust tube holding member configured to be supported by an exhaust pipe extending from an inside to an outside of a building, and hold, on an inner peripheral surface thereof, an exhaust tube to be inserted into the exhaust pipe, the exhaust tube holding member comprising:
   a first annular portion which is formed with a first through hole;
   a second annular portion which is formed with a second through hole and is connected to the first annular portion, the second through hole being in communication with the first through hole and having an inner diameter larger than that of the first through hole;
   an outward protruding portion configured to protrude peripherally outward from an outer peripheral surface of the second annular portion and supported by the exhaust pipe; and
   an inward protruding portion configured to protrude peripherally inward from an inner peripheral surface of the second annular portion and supported by the exhaust pipe,
   wherein the outward protruding portion is formed to have an annular shape,
   the outward protruding portion includes a first outward protruding member having an annular shape and a second outward protruding member having an annular shape,
   the first outward protruding member has an outer diameter larger than the outer diameter of the second outward protruding member, and
   the second outward protruding member is disposed closer to the first annular portion than the first outward protruding member.

2. An exhaust tube holding member configured to be supported by an exhaust pipe extending from an inside to an outside of a building, and hold, on an inner peripheral surface thereof, an exhaust tube to be inserted into the exhaust pipe, the exhaust tube holding member comprising:
   a first annular portion which is formed with a first through hole;
   a second annular portion which is formed with a second through hole and is connected to the first annular portion, the second through hole being in communication with the first through hole and having an inner diameter larger than that of the first through hole;
   an outward protruding portion configured to protrude peripherally outward from an outer peripheral surface of the second annular portion and supported by the exhaust pipe; and
   an inward protruding portion configured to protrude peripherally inward from an inner peripheral surface of the second annular portion and supported by the exhaust pipe,
   wherein the outward protruding portion is formed to have an annular shape, the outward protruding portion includes a first outward protruding member having an annular shape and a second outward protruding member having an annular shape, in a cross section perpendicular to the radial direction of the outward protruding portion, the outer peripheral end of the first outward protruding member has a radius of curvature greater than the radius of curvature of the outer peripheral edge of the second outward protruding member, and the second outward protruding member is disposed closer to the first annular portion than the first outward protruding member.

3. An exhaust tube holding member configured to be supported by an exhaust pipe extending from an inside to an outside of a building, and hold, on an inner peripheral surface thereof, an exhaust tube to be inserted into the exhaust pipe, the exhaust tube holding member comprising:

a first annular portion which is formed with a first through hole;

a second annular portion which is formed with a second through hole and is connected to the first annular portion, the second through hole being in communication with the first through hole and having an inner diameter larger than that of the first through hole;

an outward protruding portion configured to protrude peripherally outward from an outer peripheral surface of the second annular portion and supported by the exhaust pipe; and an inward protruding portion configured to protrude peripherally inward from an inner peripheral surface of the second annular portion and supported by the exhaust pipe, wherein the inward protruding portion is formed to have an annular shape, the inward protruding portion includes a first inward protruding member having an annular shape and a second inward protruding member having an annular shape, the first inward protruding member has an inner diameter smaller than the inner diameter of the second inward protruding member, and the second inward protruding member is disposed closer to the first annular portion than the first inward protruding member.

4. An exhaust tube holding member configured to be supported by an exhaust pipe extending from an inside to an outside of a building, and hold, on an inner peripheral surface thereof, an exhaust tube to be inserted into the exhaust pipe, the exhaust tube holding member comprising:

a first annular portion which is formed with a first through hole;

a second annular portion which is formed with a second through hole and is connected to the first annular portion, the second through hole being in communication with the first through hole and having an inner diameter larger than that of the first through hole;

an outward protruding portion configured to protrude peripherally outward from an outer peripheral surface of the second annular portion and supported by the exhaust pipe; and an inward protruding portion configured to protrude peripherally inward from an inner peripheral surface of the second annular portion and supported by the exhaust pipe, wherein the inward protruding portion is formed to have an annular shape, the inward protruding portion includes a first inward protruding member having an annular shape and a second inward protruding member having an annular shape, in a cross section perpendicular to the radial direction of the inward protruding portion, the inner peripheral end of the first inward protruding member has a radius of curvature greater than the radius of curvature of the inner peripheral edge of the second inward protruding member, and the second inward protruding member is disposed closer to the first annular portion than the first inward protruding member.

* * * * *